United States Patent
Yoshihara

(10) Patent No.: US 10,048,406 B2
(45) Date of Patent: Aug. 14, 2018

(54) ANTI-REFLECTION FILM, MANUFACTURING METHOD THEREOF, POLARIZING PLATE AND TRANSMISSION TYPE LCD

(71) Applicant: TOPPAN PRINTING CO., LTD., Tokyo (JP)

(72) Inventor: Toshiaki Yoshihara, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 528 days.

(21) Appl. No.: 14/714,049

(22) Filed: May 15, 2015

(65) Prior Publication Data

US 2015/0247958 A1 Sep. 3, 2015

Related U.S. Application Data

(62) Division of application No. 12/717,844, filed on Mar. 4, 2010, now abandoned.

(30) Foreign Application Priority Data

Mar. 9, 2009 (JP) .................................. 2009-054809

(51) Int. Cl.
*B05D 3/04* (2006.01)
*G02B 1/11* (2015.01)
(Continued)

(52) U.S. Cl.
CPC .................. *G02B 1/11* (2013.01); *C08F 2/48* (2013.01); *C09D 5/006* (2013.01); *G02B 1/111* (2013.01);
(Continued)

(58) Field of Classification Search
CPC .. C08F 2/48; G02B 1/111; G02B 1/11; G02B 1/118; C09D 5/006; Y10T 428/1086; Y10T 428/265
See application file for complete search history.

(56) References Cited

U.S. PATENT DOCUMENTS 6,476,969 B2    11/2002   Oka et al.
7,371,786 B2 *   5/2008   Yoshihara ................ C09D 4/00
                                                                                                          523/205
(Continued)

FOREIGN PATENT DOCUMENTS

JP      11-092750     4/1999
JP    2002-182005    6/2002
(Continued)

OTHER PUBLICATIONS

English Machine Translation of JP2006-126802.*
(Continued)

*Primary Examiner* — Robert S Walters, Jr.
(74) *Attorney, Agent, or Firm* — Squire Patton Boggs (US) LLP

(57) ABSTRACT

The present invention provides an anti-reflection film which has excellent optical properties at a low production cost. The anti-reflection film of the present invention has a low refractive index hard coat layer having low refractive index particles and a binder matrix which is formed by curing an ionizing radiation curable material on a transparent substrate. It is a feature of the anti-reflection film of the present invention that the low refractive index hard coat layer has two optically distinguishable layers from the transparent substrate side, namely, an intermediate layer and a localized layer wherein the low refractive index particles are localized, and the refractive index and optical thickness of the localized layer are in the range of 1.29-1.43 and in the range of 100-200 nm, respectively.

16 Claims, 4 Drawing Sheets

(51) Int. Cl.
  *G02B 1/118* (2015.01)
  *C08F 2/48* (2006.01)
  *G02B 1/111* (2015.01)
  *C09D 5/00* (2006.01)

(52) U.S. Cl.
  CPC ......... *G02B 1/118* (2013.01); *Y10T 428/1086* (2015.01); *Y10T 428/265* (2015.01)

(56) References Cited

U.S. PATENT DOCUMENTS

| | | |
|---|---|---|
| 2005/0179842 A1 | 8/2005 | Ichihashi |
| 2007/0042173 A1 | 2/2007 | Nagaoka et al. |
| 2010/0104879 A1 | 4/2010 | Okano |

FOREIGN PATENT DOCUMENTS

| | | |
|---|---|---|
| JP | 2005-144849 | 6/2005 |
| JP | 2005-199707 | 7/2005 |
| JP | 2005-202389 | 7/2005 |
| JP | 2006-126802 | 5/2006 |
| JP | 2006-159415 | 6/2006 |
| JP | 2007-121993 | 5/2007 |
| JP | 2008-056837 | 3/2008 |
| JP | 2008-291174 | 12/2008 |
| WO | WO 2009/001629 | 12/2008 |

OTHER PUBLICATIONS

Notification of Reasons for Refusal from JPO for appl. No. 2010-011912, dispatched Jan. 15, 2014, 4 pgs.

Translation of the Notification of Reasons for Refusal from JPO for appl. No. 2010-011912, dispatched Jan. 15, 2014, 6 pgs.

EasyRGB Color Calculator, Last acessed Dec. 13, 2012, http://www.easyrgb.com/index.php?X=CALC#Result.

* cited by examiner

ANTI-REFLECTION FILM, MANUFACTURING METHOD THEREOF, POLARIZING PLATE AND TRANSMISSION TYPE LCD

CROSS REFERENCE TO RELATED APPLICATION

This is a Divisional Patent Application of U.S. patent application Ser. No. 12/717,844, filed Mar. 4, 2010 (published as US-2010-0227085-A1 on Sep. 9, 2010), which is based on and claims the benefit of priority from the Japanese Patent Application number 2009-054809, filed on Mar. 9, 2009, the entire contents of which are incorporated herein by reference.

BACKGROUND OF THE INVENTION

Field of the Invention

The present invention relates to an anti-reflection film which is arranged in order to prevent external light from reflecting on a window or a surface of display devices etc. Specifically, the present invention relates to an anti-reflection film applied on a surface of a liquid crystal display (LCD), CRT display, organic electroluminescent display (ELD), plasma display (PDP), surface-conduction electron-emitter display (SED) and field emission display (FED) etc. Among these, this invention relates to an anti-reflection film applied on a surface of an LCD, especially a transmission type LCD.

Description of the Related Art

In general, displays are used under external light whether they are used indoors or outdoors. The external light incident to a display surface is reflected on the surface so that a displayed image is interfered with by the reflected image and the quality of display decreases. Hence, it is necessary to provide a display surface with an anti-reflection function, and further, improvements of the anti-reflection function along with introductions of other extra useful functions are being demanded.

In general, an anti-reflection function is realized by forming an anti-reflection layer having a multilayer structure with repeating high refractive index layers and low refractive index layers made of a transparent material such as metal oxide on a transparent substrate. The anti-reflection layer having this type of multilayer structure can be obtained by a dry coating method such as chemical vapor deposition (CVD) and physical vapor deposition (PVD). In the case where the anti-reflection layer is formed by a dry coating method, while there is an advantage of fine thickness controllability, there is also a problem of low productivity due to a limitation of a deposition process performed in a vacuum chamber, which is unsuitable for mass production. Thus, wet coating methods, which use a coating liquid for forming an anti-reflection layer and make it possible to provide a large display, produce continuously, and reduce costs, attract attention as a forming method of an anti-reflection layer.

In addition, an anti-reflection film in which the anti-reflection layer is arranged on a transparent substrate film generally has a hard coat layer formed by curing an acrylic material which is curable by ionizing radiation as well. The hard coat layer is arranged between the transparent substrate and the anti-reflection layer for the purpose of providing a surface hardness to a relatively soft surface of the anti-reflection film. The hard coat layer is provided with a high level of surface hardness, abrasion resistance, luster and transparency due to the acrylic material.

In the case where the anti-reflection layer is formed by a wet coating method, at least, a low refractive index layer is coated onto such a hard coat layer and is producible with low costs. Thus, this type of anti-reflection film is widely distributed in the market.

<Patent document 1> JP-A-2005-202389
<Patent document 2> JP-A-2005-199707
<Patent document 3> JP-A-H11-092750
<Patent document 4> JP-A-2007-121993
<Patent document 5> JP-A-2005-144849
<Patent document 6> JP-A-2006-159415

It is possible to reduce reflection of external light by arranging an anti-reflection film having a hard coat layer and anti-reflection layer on the surface of a display device and utilizing its anti-reflection function so that a contrast in bright places can be improved. Moreover at the same time, it is possible to display an image more brightly since the visible light transmittance of the anti-reflection film can be improved. The anti-reflection film is also expected to have an energy saving effect due to a reduction of the power consumption of the backlight etc.

SUMMARY OF THE INVENTION

An anti-reflection film with low production costs is demanded. In addition, an anti-reflection film with excellent anti-reflection properties and free from an interference fringe is demanded. The present invention aims to provide an anti-reflection film with excellent anti-reflection properties at a low production cost.

In order to meet this aim, a first aspect of the present invention is an anti-reflection film having a transparent substrate and a low refractive index hard coat layer, the low refractive index hard coat layer including low refractive index particles and a binder matrix which can be formed by curing an ionizing radiation curable material, the low refractive index hard coat layer having a mixed layer in which the binder matrix and the component of the transparent substrate blend together with a gradient and a localized layer which includes the conductive particles and the binder matrix, the mixed layer being optically indistinguishable, and the localized layer being optically distinguishable and having a refractive index in the range of 1.29-1.43 and an optical thickness in the range of 100-200 nm.

Moreover, a second aspect of the present invention is the anti-reflection film, wherein the localized layer has an optical thickness in the range of 110-140 nm.

Moreover, a third aspect of the present invention is the anti-reflection film, wherein a content ratio of the low refractive index particles in the low refractive index hard coat layer is in the range of 0.5-5 wt %, and a content amount of the conductive particles per unit area of the low refractive index hard coat layer is in the range of 0.05-0.5 g/m².

Moreover, a fourth aspect of the present invention is the anti-reflection film, further having an intermediate layer which is optically indistinguishable and arranged between the mixed layer and the localized layer and contains the binder matrix and the component of the transparent substrate.

Moreover, a fifth aspect of the present invention is the anti-reflection film, wherein the intermediate layer includes 95 wt % or more of the binder matrix.

Moreover, a sixth aspect of the present invention is the anti-reflection film, wherein the mixed layer has a thickness of 0.5 μm or more.

Moreover, a seventh aspect of the present invention is the anti-reflection film, wherein an average luminous reflectance on the localized layer side surface of the anti-reflection film is in the range of 0.5-2.0%, and a reflection hue in the L*a*b* chromaticity coordinate system on the localized layer side surface of the anti-reflection film satisfies $0.00 \leq a^* \leq 3.00$ and $-3.00 \leq b^* \leq 3.00$.

Moreover, an eighth aspect of the present invention is the anti-reflection film, wherein the low refractive index hard coat layer further contains an electron conducting polymer.

Moreover, a ninth aspect of the present invention is the anti-reflection film, wherein the transparent substrate is mainly made of a triacetyl cellulose film.

Moreover, a tenth aspect of the present invention is a polarizing plate having the anti-reflection film of the present invention, a polarizing layer and a second transparent substrate, the polarizing layer and the second transparent substrate being arranged on the opposite surface of the anti-reflection film from a side on which the low refractive index hard coat layer is formed.

Moreover, an eleventh aspect of the present invention is an LCD having the polarizing plate of the present invention, a liquid crystal cell, a second polarizing plate and a backlight unit.

In addition, a twelfth aspect of the present invention is a method for manufacturing an anti-reflection film which has a low refractive index hard coat layer on a transparent substrate including: preparing a coating liquid for forming the low refractive index hard coat layer comprising low refractive index particles, a binder matrix which includes an ionizing radiation curable material, and solvents; coating the coating liquid for forming the low refractive index hard coat layer to form a coated layer on the transparent substrate; drying the coated layer; and irradiating ionizing radiation to the coated layer to form the low refractive index hard coat layer, the solvents in the coating liquid for forming the low refractive index hard coat layer including a solvent which dissolves the transparent substrate or causes the transparent substrate to swell by a ratio in the range of 30-90 wt %, the low refractive index hard coat layer including a mixed layer in which the binder matrix and a component of the transparent substrate blend together with a gradient and a localized layer which comprises the low refractive index particles and the binder matrix, the mixed layer being optically indistinguishable, and the localized layer being optically distinguishable and having a refractive index in the range of 1.29-1.43 and an optical thickness in the range of 100-200 nm.

Moreover, a thirteenth aspect of the present invention is the method, wherein it takes a time in the range of 2-60 seconds for the solvents contained in the coated layer to evaporate off to a level of 10 wt % or lower after the coated layer is formed.

Moreover, a fourteenth aspect of the present invention is the method, wherein the coating liquid for forming the low refractive index hard coat layer contains the solvents by a ratio in the range of 55-85 wt %.

Moreover, a fifteenth aspect of the present invention is the method, wherein the process of drying the coated layer is performed under an atmosphere condition of a solvent concentration in the range of 0.2-10 vol %.

Moreover, a sixteenth aspect of the present invention is the method, wherein the process of drying the coated layer includes a primary drying process which is performed at a temperature in the range of 20-30° C. just after the coated layer is formed and a secondary drying process which is performed at a temperature in the range of 50-150° C. after the primary drying process.

Moreover, a seventeenth aspect of the present invention is the method, wherein it takes a time in the range of 2-60 seconds to perform the primary drying process.

Moreover, an eighteenth aspect of the present invention is the method, wherein the transparent substrate comprises triacetyl cellulose and the solvents in the coating liquid for forming the low refractive index hard coat layer include N-methylpyrrolidone.

In the case of the anti-reflection film of the present invention, in which low refractive index particles are localized in the localized layer, it is possible to reduce total usage of the conductive particles relative to the case where a low refractive index layer is separately formed. Accordingly, it is possible to prevent a surface strength decrease and visible light transmittance decrease caused by an excessive addition of the low refractive index particles. In addition, it is also possible to save time for producing the anti-reflection film and reduce production costs relative to the case where the low refractive index layer is formed separately from the hard coat layer because a layer of the low refractive index function and a layer of the hard coat function are formed simultaneously.

In addition, the anti-reflection film of the present invention has the mixed layer. Since the composition (a ratio of the transparent substrate component and the binder matrix) in the mixed layer varies with gradient and the mixed layer is optically indistinguishable, the mixed layer absorbs a difference in refractive index between both adjacent layers (the transparent substrate and the localized layer) so that the interference generation caused by this difference is prevented.

Furthermore, the localized layer in the anti-reflection film of the present invention is optically distinguishable. As the refractive index of the localized layer is in the 1.29-1.43 range, the localized layer can also be regarded as a low refractive index layer.

It is possible to provide an anti-reflection film having excellent optical properties at a low production cost by making the anti-reflection film of the present invention as described above.

BRIEF DESCRIPTION OF THE DRAWINGS

FIG. 5A illustrates an example of an anti-reflection film having a mixed layer and an intermediate layer which are optically indistinguishable.

FIG. 5B illustrates an example of an anti-reflection film having a mixed layer but almost no intermediate layer.

FIG. 5C illustrates an example of an anti-reflection film having a thin mixed layer and an intermediate layer which is optically distinguishable by the thin mixed layer.

DESCRIPTION OF REFERENCE NUMERALS AND SIGNS

Figure 1:
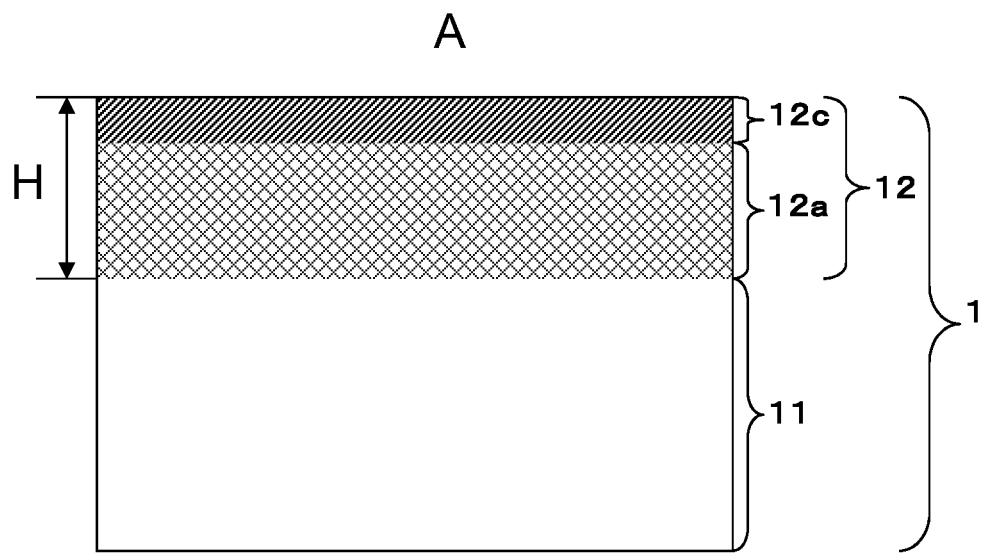
FIG. 1 illustrates a cross sectional exemplary diagram of an anti-reflection film of the present invention.

1: Anti-reflection film
11: First transparent substrate
12: Low refractive index hard coat layer
12a: Mixed layer
12b: Intermediate layer
12c: Localized layer
2: Polarizing plate
22: Second transparent substrate
23: Polarizing layer
3: Liquid crystal cell
4: Second polarizing plate
41: Third transparent substrate
42: Fourth transparent substrate
43: Second polarizing layer
5: Backlight unit
A: Anti-reflection film surface
100: Peaks can be detected because of an acute change (optically distinguishable).
200: Peaks can not be detected because a change of slope is mild (optically indistinguishable).
300: Broad peaks can be detected because a change of slope is steep (optically distinguishable).

DETAILED DESCRIPTION OF THE INVENTION

FIG. 1 shows an anti-reflection film of the present invention. An anti-reflection film 1 of the present invention has a low refractive index hard coat layer 12 on a surface of a transparent substrate 11. The low refractive index hard coat layer 12 includes low refractive index particles and a binder matrix which is formed by curing an ionizing radiation curable material. Since the low refractive index layer 12 has such a binder matrix, it is possible to provide the anti-reflection film with a high level of surface hardness and excellent abrasion resistance.

The low refractive index hard coat layer 12 in the anti-reflection film 1 of the present invention has the low refractive index particles and the binder matrix. The binder matrix in the low refractive index hard coat layer of the present invention means a component other than the low refractive index particles. The low refractive index hard coat layer of the present invention is formed by coating a coating liquid for forming a low refractive index hard coat layer on the transparent substrate. The solid content of the coating liquid for forming a low refractive index hard coat layer besides the low refractive index particles refers to the binder matrix forming material. The binder matrix forming material includes ionizing radiation curable material and cures to form the binder matrix by irradiating ionizing radiation.

The low refractive index hard coat layer in the anti-reflection film 1 of the present invention has the mixed layer 12a on the transparent substrate side and the localized layer 12c in which the low refractive index particles are concentrated. The mixed layer is optically indistinguishable while the localized layer is optically distinguishable. The localized layer has a refractive index in the range of 1.29-1.43 and the optical thickness in the range of 100-200 nm.

It is possible to provide a high level of anti-reflection properties to the anti-reflection film of the present invention with a small amount of low refractive index particles content in the entire low refractive index layer. In other words, it is possible to provide a high level of visible light transmittance as well as a high level of anti-reflection properties. On the other hand, the mixed layer 12a, which is on the transparent side, includes few low refractive index particles. In the low refractive index hard coat layer 12 in the anti-reflection film of the present invention, the localized layer 12c is formed with low refractive index particles and a binder matrix while the mixed layer 12a is formed mainly with a binder matrix and the transparent substrate component and with few low refractive index particles.

The refractive index gradually changes from a value of the refractive index of the transparent substrate 11 to a value of the refractive index of the binder matrix contained in the low refractive index hard coat layer 12 in the thickness direction of the mixed layer 12a from the transparent substrate 11 side toward the low refractive index hard coat layer 12 side. In other words, the binder matrix and the transparent substrate component are mixed together with an inclined blend ratio in the mixed layer.

It is possible in the anti-reflection film of the present invention to prevent interference fringe caused by a difference in refractive index between the low refractive index hard coat layer and the transparent substrate by arranging the mixed layer 12a which has an inclined refractive index changing gradually from a value of the transparent substrate 11 to a value of the binder matrix in the low refractive index hard coat layer 12. In addition, the mixed layer 12a can improve adhesiveness between the transparent substrate 11 and the low refractive index hard coat layer 12.

Figure 5A:
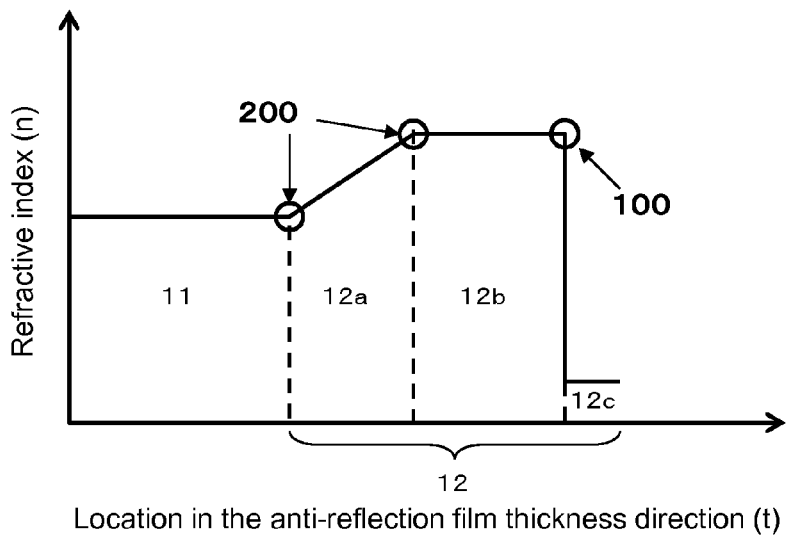
FIG. 5A to FIG. 5C are exemplary diagrams of a refractive index variation in an anti-reflection film of the present invention.
Figure 5B:
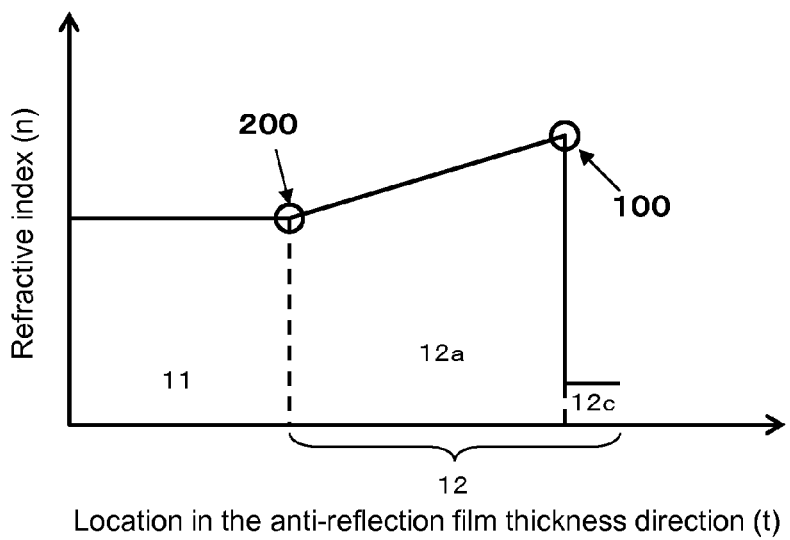
Figure 5C:
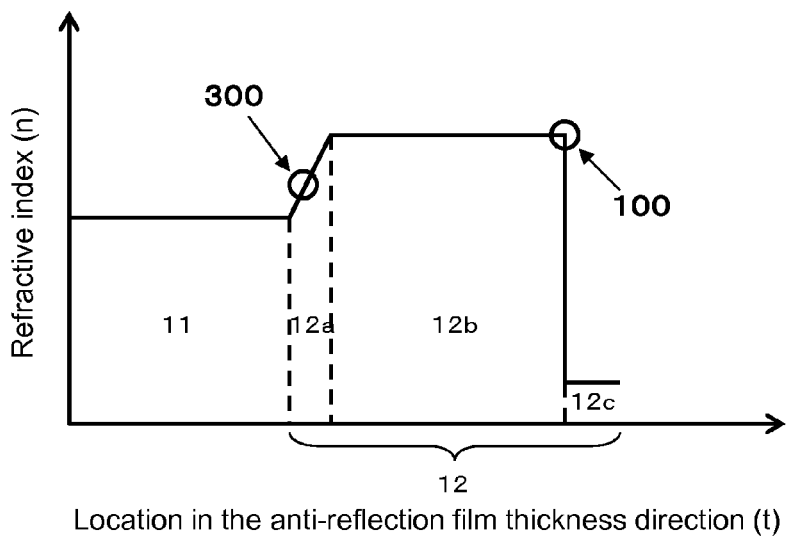

FIG. 5A to FIG. 5C exemplary illustrates a variation of refractive index along a location in the anti-reflection film thickness direction. In FIG. 5, the vertical axis represents refractive index (n) and the horizontal axis represents the location in the anti-reflection film thickness direction. As the location in FIG. 5A to FIG. 5C moves from left to right, the indicated location changes from the transparent substrate 11 side to the surface of the low refractive index hard coat layer 12 (localized layer 12c side).

The anti-reflection film of the present invention has at least low refractive index hard coat layer 12, and the low refractive index hard coat layer 12 has the mixed layer 12a, in which the transparent substrate component and the binder matrix are mixed together with a blend ratio varying with a gradient, and the localized layer 12c, which includes the binder matrix and the low refractive index particles (FIG. 5A and FIG. 5B).

The localized layer is optically distinguishable. "Optically distinguishable" means such a state that when a spectral reflectance of the anti-reflection film of the present invention is obtained using visible light (wavelength in the range of 380-800 nm) with 5 degrees of incident angle from the surface 'A' side (reference FIG. 1 and FIG. 2) of the anti-reflection film and an optical simulation is performed on this spectral reflectance, an interference peak caused by the localized layer 12c besides a peak of the low refractive index layer can be observed.

Ordinarily, in manufacturing an anti-reflection film etc. a thickness of each functional layer (a hard coat layer and a low refractive index layer etc.) can be estimated by a composition of coating liquid and coating amount per unit area. Since this is also true in the anti-reflection film of the present invention, the thickness of the low refractive index hard coat layer can be predicted. The result of simulation, however, actually turns out a peak which suggests a thickness significantly thinner than the predicted thickness (hereafter called "envisioned thickness"). Thus, it is clear that the peak is caused by the localized layer 12c (or the peak certifies the presence of the localized layer). Then, this result further implies the presence of other layers having a thickness corresponding to a difference between the envisioned thickness and the thickness of the localized layer.

These "other layers" include the mixed layer 12a, in which the binder matrix component of the low refractive index hard coat layer and the transparent substrate component are mixed with an inclined ratio, in the anti-reflection film of the present invention. Since these "other layers" include the transparent substrate component other than the binder matrix, strictly speaking, the thickness of the "other layers" is thicker than the thickness corresponding to a difference between the envisioned thickness (of the low refractive index hard coat layer 12) and the thickness of the localized layer 12c. In such a case where the "other layers" exist, an interference fringe is never observed when an appearance is checked after the rear surface of the anti-reflection film is painted with black.

In the mixed layer 12a, the binder matrix which is derived from the low refractive index hard coat layer 12 and the component derived from the transparent substrate 11 are mixed together with a blend ratio varying with a gradient so that there are no acute changes in the refractive index (reference FIGS. 5A and 5B). Therefore, it is possible to prevent interference caused by a difference in refractive index between the mixed layer 12a and an adjacent layer thereof (namely, each of the transparent substrate 11 and the intermediate layer 12b in FIG. 5A, and the transparent substrate 11 in FIG. 5B etc.) at their boundary so that an anti-reflection film of the present invention is provided with excellent optical properties. Such prevention of interference leads to an "optically indistinguishable" state (that is, a corresponding peak is undetectable by a spectral reflectance measurement).

The low refractive index hard coat layer provides the anti-reflection film with a hard coat function by containing a certain amount (or more) of the binder matrix component which has hard coating properties. Regarding the anti-reflection film of the present invention, the binder matrix component is included in the localized layer 12c and the mixed layer 12a, respectively, in the antistatic hard coat layer. In the case where there is too much transparent substrate component in the mixed layer, however, the hard coat function may not be achieved sufficiently since the binder matrix is excessively diluted with the transparent substrate component.

Figure 2:
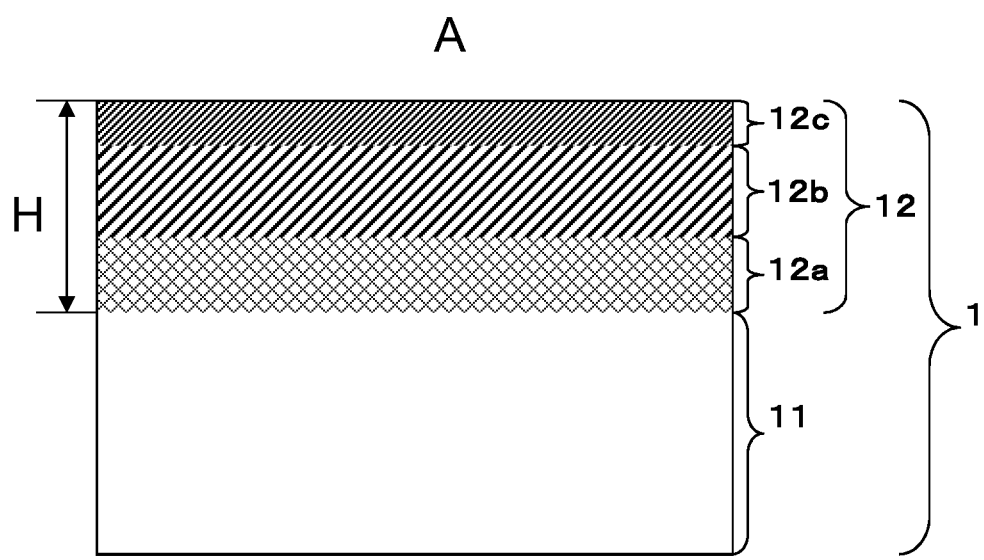
FIG. 2 illustrates a cross sectional exemplary diagram of an anti-reflection film of the present invention.

Thus, it is preferred to form an intermediate layer 12b between the localized layer 12c and the mixed layer 12a (refer to FIG. 2 and FIG. 5A). Since the intermediate layer 12b has a higher concentration of binder matrix component which gives a hard coat function than the mixed layer 12a and an almost constant composition ratio throughout the layer, it is possible to steadily provide a hard coat function to the anti-reflection film of the present invention. It is further preferable that the intermediate layer 12b includes 95% by weight or more of binder matrix so as to achieve a hard coat function with certainty.

This intermediate layer 12b is also included in the low refractive index hard coat layer 12 and is regarded as one of the "other layers".

It is further preferable that the intermediate layer 12b includes 95% by weight or more of binder matrix so as to achieve a hard coat function with certainty.

In addition, when the intermediate layer 12b includes binder matrix by a ratio of 95% by weight or more, the localized layer 12c is supposed to include low refractive index particles with a significantly high ratio (in other words, the low refractive index particles are highly concentrated in the localized layer) and it is possible to improve the anti-reflection effect of the anti-reflection film of the present invention.

The amount of the binder matrix present in each layer included in the low refractive index hard coat layer 12 of the anti-reflection film of the present invention can be measured by fluorescent X-ray analysis and Raman spectrum analysis.

The abundance (content ratio) of the low refractive index particles in each layer is measurable by a fluorescent X-ray analysis. In addition, the abundance (content ratio) of the transparent substrate component in each layer can be obtained from a measurement of a cross section profile by Raman spectrum analysis. Thus, the abundance (content ratio) of the binder matrix in each layer can be obtained by subtracting the abundance of the low refractive index particles and the transparent substrate component from the entire sample of each layer.

In this specification, a concentration of a component in each layer (the low refractive index hard coat layer, the mixed layer, the intermediate layer and the localized layer) refers to an averaged concentration in the entire mixed layer unless differently noticed. This is because the mixed layer has a varying concentration depending on the point of measurement and no fixed concentration can be obtained since it has a composition with a gradient.

Even in the case where only a significantly thin intermediate layer 12b is formed between the localized layer 12c and the mixed layer 12a (refer to FIG. 5B), the amount of binder matrix in the upper part (which is adjacent to the localized layer) of the mixed layer may be sufficient to provide hard coat properties according to circumstances. It is preferable, however, that a thickness of the intermediate layer in the anti-reflection film of the present invention is 2 µm or more in order to obtain more steady hard coat properties with certainty. Although there is no upper limit to the thickness of the intermediate layer, it is preferable that the combined thickness of the intermediate layer and the antistatic hard coat layer is about 15 µm or less because plastic properties are lost and unnecessary material costs are required in the case where the combined thickness is too thick.

The compositions of the intermediate layer 12b and the mixed layer 12a are different although the type of the materials contained in the intermediate layer component and the mixed layer component are almost the same. The mixed layer 12a has a composition which varies with a gradient in the layer thickness direction and there are no acute changes in refractive index as described above. Accordingly, the mixed layer 12a itself is always optically indistinguishable. In contrast, the intermediate layer 12b does not have a composition gradient (FIG. 5A). It is true that, strictly speaking, there may be a composition gradient, but it is such a small gradient that the interference peak caused by the intermediate layer and the adjacent layer does not disappear. Hence, whether the intermediate layer 12b is optically distinguishable or not depends on the state of the adjacent layer.

In the case where the mixed layer 12a is extremely thin and the intermediate layer 12b is thick, the difference in refractive index between both adjacent layers is no longer completely absorbed in the mixed layer 12a and the interference peak becomes detectable. In fact, as in the case of the localized layer, it is possible to observe an interference peak caused by the intermediate layer 12b along with peaks of the low refractive index layer 12 and the localized layer 12c when an optical simulation is conducted on a spectral reflectance of visible light (wavelength in the range of 380-800 nm) with 5 degrees of an incident angle from the 'A' side of the anti-reflection film.

The term optically indistinguishable does not mean a state wherein the mentioned layer is not formed.

In the case where the anti-reflection film has an optically distinguishable intermediate layer 12b, it is possible to check whether the anti-reflection film also has a mixed layer 12a by a measurement of the spectral reflectance. When spectral reflectance of an anti-reflection film having an optically distinguishable intermediate layer is measured, a clear interference peak indicating a layer significantly thinner than the "envisioned thickness" and a vague peak indicating a layer slightly thinner than the "envisioned thickness" are observed (FIG. 5C). The former peak indicates the localized layer 12c as described above. As described above, since the "other layers" which should include the mixed layer 12a and the intermediate layer 12b is thicker than the difference between the "envisioned thickness" of the low refractive index hard coat layer and the thickness of the localized layer 12c, the result is that the latter peak suggests an existence of the intermediate layer 12b and the rest of the total thickness suggests an existence of the mixed layer 12a.

While an anti-reflection film having such a layer structure (which includes an optically distinguishable intermediate layer) certainly has hard coat properties, the film adversely has undesirable optical properties and an interference fringe is also generated.

Hence, it is preferable that an anti-reflection film of the present invention has an optically indistinguishable intermediate layer in addition to an optically indistinguishable mixed layer and an optically distinguishable localized layer as the low refractive index hard coat layer.

If the mixed layer 12a has a sufficient thickness, it is possible to suppress interferences caused by differences in refractive index between both adjacent layers and the mixed layer. Then, the intermediate layer becomes optically indistinguishable so that the interference peak can not be detected (FIG. 5A).

As a result of having an optically indistinguishable intermediate layer, it becomes possible to prevent interference and still maintain hard coat properties.

It is preferable that the mixed layer has a thickness of 0.5 μm or higher in order to make the intermediate layer optically indistinguishable. It is true that the thicker the mixed layer is the better from a viewpoint of preventing interference peak. However, a mixed layer which is too thick leads to a decrease in a ratio of the binder matrix and adversely affects the hard coat properties. Hence, it is preferable that the thickness of the mixed layer is 10 μm or lower and furthermore, 5 μm or lower is more preferable from the viewpoint of arranging an intermediate layer.

Even in the case where the mixed layer and the intermediate layer are optically indistinguishable, the existence of these layers can be presumed by considering the difference between the "envisioned thickness" of the low refractive index hard coat layer and the thickness of the localized layer obtained from the optical simulation of the spectral reflectance. Moreover, by measuring a cross-section profile by Raman spectral analysis, it is possible to confirm the existence of the mixed layer and the intermediate layer, and furthermore, it is possible to confirm the fact that the mixed layer has a composition varying with a gradient while the intermediate layer has an almost constant composition.

It is a feature of the anti-reflection film of the present invention that the low refractive index hard coat layer 12 includes a mixed layer 12a which is optically indistinguishable and a localized layer 12c (in which conductive particles are concentrated and) which is optically distinguishable. Moreover, it is also a feature of the anti-reflection film of the present invention that the refractive index of the localized layer 12c is in the range of 1.29-1.43 and the optical thickness of the localized layer 12c is in the range of 100-200 nm. As a result, the localized layer 12c can also be used as a low refractive index layer so that the resultant anti-reflection film is provided with a high level of anti-reflection properties. In addition, since the optical thickness of the localized layer in the range of 100-200 nm is just ¼ the wavelength of the visible light, the resultant anti-reflection film is provided with a high level of anti-reflection properties. The optical thickness (nd) of a layer is a value obtained by multiplying the layer thickness (d) by the refractive index (n) of the layer.

The optical thickness and refractive index of the localized layer 12c can be obtained by an optical simulation method from the spectral reflectance curve measured at an incident angle of 5 degrees from the 'A' side surface of the anti-reflection film using a spectral photometer.

In addition, not only the intermediate layer, which mainly acts as the hard coat, but also a localized layer, which can be used as a low refractive index layer, can be formed by once coating a coating liquid for forming a low refractive index hard coat layer on the transparent substrate in the anti-reflection film of the present invention. Hence, more production costs can be saved than in the case where a hard coat layer and a low refractive index layer are coated and formed on the transparent substrate in sequence.

It is still further preferable in the anti-reflection film of the present invention that the localized layer 12c has an optical thickness in the range of 110-140 nm. By adjusting the optical thickness of the localized layer 12c in the range of 110-140 nm, it is possible to make the spectral reflectance curve on the 'A' side surface of the anti-reflection film have a local minimal value at around 500 nm. The spectral reflectance curve of the anti-reflection film of the present invention, which includes an optically indistinguishable mixed layer and an optically distinguishable localized layer, has a steeper upward curve in the short wavelength direction from the local minimal point than in the long wavelength direction. At this time, such a steep upward curve in the short wavelength direction from the local minimal point causes a coloring of the reflection light on the anti-reflection film as well as color unevenness of the anti-reflection film when there is thickness unevenness in the localized layer. In a preferred embodiment of the present invention, it is possible to adjust the local minimal point of the spectral reflectance curve at around 500 nm and to weaken the steepness of the upward curve in the short wavelength direction from the local minimal point by making the optical thickness of the localized layer 12c in the range of 110-140 nm. As a result, it is possible to make the reflection hue small and to prevent a generation of color unevenness caused by the steep upward curve in the short wavelength direction from the local minimal point.

The color unevenness in the present invention means unevenness in reflection color caused by thickness unevenness in the localized layer 12b, which acts as the low refractive index layer, and a large degree of in-plane color unevenness results in a defective appearance. Interference fringe is a certain type of color unevenness which is caused by an optical interference (mainly relating to a difference in refractive index between the substrate and the low refractive index hard coat layer) and a phenomenon which is observed as a rainbow-like color unevenness caused by a plurality of optical interferences when the low refractive index hard coat layer is thick.

In addition, it is preferable in the anti-reflection film of the present invention that a low refractive index particle content ratio in the entire low refractive index hard coat layer 12 is in the range of 0.5-5.0% by weight and low refractive index particle content in a unit area of the low refractive index hard coat layer is in the range of 0.05-0.50 g/m². It is possible in the present invention to obtain a sufficient antistatic property and prevent a fall in visible light transmittance of the anti-reflection film caused by an addition of low refractive index particles by forming the localized layer 12c with a low level of the low refractive index particle content ratio (in other words, a relatively small low refractive index particle content) localizing low refractive index particles in the low refractive index hard coat layer into a surface region of the low refractive index hard coat layer.

In the case where the low refractive index particle content ratio in the low refractive index hard coat layer 12 is smaller than 0.5% by weight, the anti-reflection film possibly fails to obtain a sufficient anti-reflection property because it might be impossible to localize a sufficient amount of low refractive index particles in the localized layer. On the other hand, in the case where the low refractive index particle content ratio exceeds 5.0% by weight, the resultant anti-reflection film may have insufficient visible light transmittance and in addition requires high costs. In the case where the low refractive index particle content in a unit area of the low refractive index hart coat layer is smaller than 0.05 g/m², the anti-reflection film may have only an insufficient anti-reflection property because it is impossible to localize a sufficient amount of the low refractive index particles in the localized layer. On the other hand, in the case where the low refractive index particle content in a unit area of the low refractive index hart coat layer exceeds 0.50 g/m², the visible light transmittance of the resultant anti-reflection film may be insufficient.

The low refractive index particle content ratio (% by weight) and the low refractive index particle content in a unit area (g/m²) can be obtained by calculation from the material used in production. In addition, it is possible to measure the low refractive index particle content (% by weight) in each layer included in the low refractive index hard coat layer using a finished product of the anti-reflection film by, for example, fluorescent x-ray analysis. Using this low refractive index particle content (% by weight) in each layer and each layer thickness, it is possible to obtain the low refractive index particle content in a unit area (g/m²).

In addition, it is preferable in the anti-reflection film of the present invention that the thickness of the low refractive index hard coat layer is in the range of 3-15 μm. In the case where the thickness is smaller than 3 um, the anti-reflection film may fail to have sufficient hardness since the low refractive index hard coat layer has only insufficient hard coat properties. In order to obtain sufficient hard coat properties, the low refractive index hard coat layer (the mixed layer, the intermediate layer and the localized layer) is preferred to have a thickness more than 3 μm or an intermediate layer with a thickness of 2 μm. In addition, although there is no upper limit from the viewpoint of optical properties, the low refractive index hard coat layer is preferred to have a thickness of at most 15 μm because high costs are required and plastic properties are liable to be lost if the layer is too thick. In the case where the thickness of the low refractive index hard coat layer exceeds 15 μm, there are problems that the anti-reflection film curls excessively by shrinkage as the low refractive index hard coat layer hardens and thus that the processability will be lost and cracks are liable to be produced in the latter processes.

In addition, it is preferable in the present invention that an average luminous reflectance on the surface 'A' of the localized layer side of the anti-reflection film is in the range of 0.5-2.0% and a reflection hue in the L*a*b* coordination system on the surface of the localized layer side of the anti-reflection film satisfies 0.00≤a*≤3.00 and −3.00≤b*≤3.00.

It is possible in the present invention to provide the anti-reflection film with excellent optical properties by forming the localized layer to work as a low refractive index layer. It is possible to provide the anti-reflection film with sufficient anti-reflection properties by making the average luminous reflectance on the surface 'A' of the anti-reflection film (refer to FIG. 1 and FIG. 2) in the range of 0.5-2.0%.

In the case where the average luminous reflectance on the surface of the localized layer side of the anti-reflection film exceeds 2.0%, it is impossible to provide the anti-reflection film with sufficient anti-reflection properties. On the other hand, it is difficult to obtain an anti-reflection film having an average luminous reflectance on the localized layer side of the anti-reflection film lower than 0.5% due to an optical interference of the localized layer. It is more preferable that the average luminous reflectance on the surface of the localized layer side of the anti-reflection film is in the range of 0.5-1.5%.

The reflection hue becomes more colorless as each a* and b* approaches 0. A region −3.00≤a*≤0.00, however, corresponds to a region of green, in which the relative luminosity is large and an observer can easily perceive color. Hence, it is preferable that the anti-reflection film of the present invention satisfies 0.00≤a*≤3.00 and −3.00≤b*≤3.00. It is possible to provide an anti-reflection film on which an observer hardly perceives color if a* and b* are in these ranges.

In addition, the anti-reflection of the present invention is preferred to include an electron conducting polymer in the low refractive index hard coat layer. If the low refractive index hard coat layer includes an electron conducting polymer, it is possible to provide the low refractive index hard coat layer with antistatic properties. In the case where the electron conducting polymer among various conductive materials is used, it is possible to make an all light transmittance decrease smaller than in the case where the low refractive index hard coat layer is formed using conductive particles such as metal particles and metal oxide particles. In addition, an electron conducting polymer also has an advantage in a point that the formation of the localized layer is not disturbed when the coating liquid for forming the low refractive index hard coat layer is coated. Moreover, an electron conducting polymer shows its antistatic performance under more various circumstances (specifically, under a low humidity condition) than ion conducting materials.

In addition, it is preferable in the anti-reflection film of the present invention that the transparent substrate 11 is made of triacetyl cellulose film. Triacetyl cellulose film has only a weak birefringence and excellent transparency. Triacetyl cellulose film is preferably used as the transparent substrate especially in the case where the anti-reflection film of the present invention is applied on a liquid crystal display (LCD) device surface.

Next, a polarizing plate using an anti-reflection film of the present invention is described.

Figure 3:
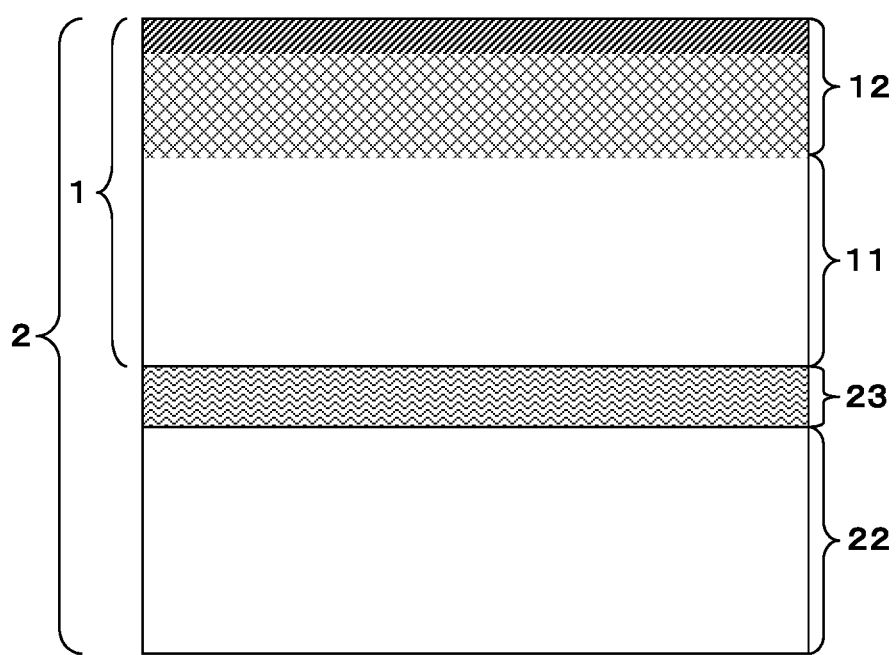
FIG. 3 illustrates a cross sectional exemplary diagram of a polarizing plate of the present invention which employs an anti-reflection film of the present invention.

FIG. 3 shows a cross sectional exemplary diagram of a polarizing plate using an anti-reflection film of the present invention. The polarizing plate 2 has a structure in which a polarizing layer 23 is interposed between a pair of transparent substrates (a first transparent substrate 11 and a second transparent substrate 22). In the polarizing plate 2 of the present invention, a low refractive index hard coat layer 12 is arranged on one of the surfaces of the first transparent substrate 11 of the anti-reflection film 1 of the present invention. Moreover, a polarizing layer 23 and a transparent substrate 22 are formed in order on the other surface of the first transparent substrate 11. In other words, the first transparent substrate 11 of the anti-reflection film 1 of the present invention is also used as one of the transparent substrates which interpose the polarizing layer 23. An iodine-added elongated polyvinyl alcohol (PVA) can be used as the polarizing layer. In addition, the same material as the transparent substrate of the anti-reflection film of the present invention (preferably, triacetyl cellulose film) can be selected as the second transparent substrate.

Next, a transmission type LCD (liquid crystal display) which employs an anti-reflection film of the present invention is described.

Figure 4:
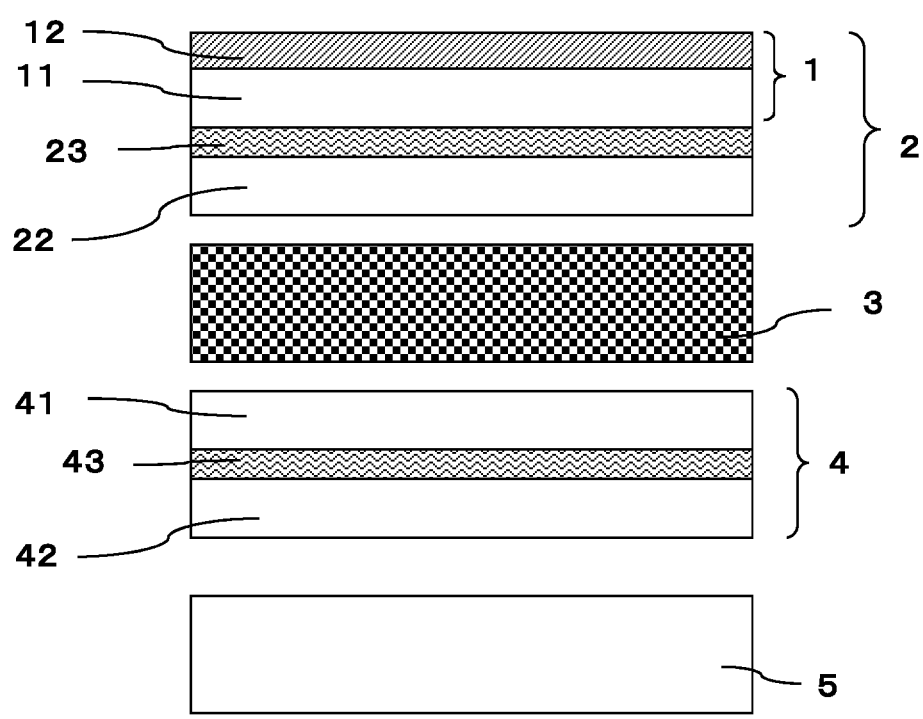
FIG. 4 illustrates a cross sectional exemplary diagram of a transmission type LCD of the present invention which includes an anti-reflection film of the present invention.

FIG. 4 illustrates a cross sectional exemplary diagram of a transmission type LCD device using an anti-reflection film of the present invention. The transmission type LCD device of the present invention in FIG. 4 has a backlight unit 5, a second polarizing plate 4, a liquid crystal cell 3 and a first polarizing plate 2 which includes the anti-reflection film 1 in order. At this point, the side of the anti-reflection film is the surface of the display device, that is, the side of an observer.

The backlight unit 5 includes a light source and a light diffusion plate (Not shown in the figures). The liquid crystal cell 3 has a transparent substrate on which one electrode is formed, another transparent substrate on which the other electrode and a color filter are formed, and liquid crystal which is inserted and sealed between these electrodes (Not shown in the figures). The second polarizing plate 4 has an interposed structure of a second polarizing layer 43 between a third transparent substrate 41 and a fourth transparent substrate 42. The liquid crystal cell 3 is arranged between the first polarizing plate 2 and the second polarizing plate 4.

In addition, the transmission type LCD device also includes other functional components. The functional components include, for example, a diffusion film, a prism sheet and a luminance improving film, which are useful for utilizing light from the backlight unit effectively, and a retardation film, which compensates a phase difference of a liquid crystal cell or a polarizing plate, but are not limited to these.

Next, a method for manufacturing an anti-reflection film of the present invention is described.

The manufacturing method includes a process of forming a coated layer by coating on the transparent substrate a coating liquid for forming a low refractive index hard coat layer which contains a binder matrix forming material, low refractive index particles and a solvent, a process of drying the coated layer, and a process of irradiating ionizing radiation to form a low refractive index hard coat layer. The binder matrix forming material contains an ionizing radiation curable material.

In the anti-reflection film of the present invention, it is possible to form a localized layer and a mixed layer by adding a solvent which dissolves the transparent substrate or causes the transparent substrate to swell to the coating liquid for forming a low refractive index hard coat layer when forming the low refractive index hard coat layer.

It is a feature of the manufacturing method of the anti-reflection film of the present invention that 30-90% by weight of the entire solvent contained in the coating liquid for forming a low refractive index hard coat layer is a solvent which dissolves the transparent substrate or causes the transparent substrate to swell.

By using a solvent which dissolves the transparent substrate or causes the transparent substrate to swell as 30-90% by weight of the entire solvent contained in the coating liquid for forming a low refractive index hard coat layer, it is possible to form a localized layer in which low refractive index particles are localized and a mixed layer in which the binder matrix component and the transparent substrate component blend together with a composition gradient.

The formation mechanism of the localized layer in this manufacturing method of the anti-reflection layer of the present invention is still not completely clear. It is assumed that after the coating liquid is coated and as the solvent which dissolves the transparent substrate or causes the transparent substrate to swell seeps into the transparent substrate, the binder matrix component also seeps into the transparent substrate and blends together with the transparent substrate component to form a mixed layer while the low refractive index particles move in the direction of the low refractive index hard coat layer's surface, namely, the opposite direction from the transparent substrate and are segregated to form a localized layer because the conductive particles hardly seep into the transparent substrate component.

It is possible to form the mixed layer which is formed between the transparent substrate and the low refractive index hard coat layer and has a composition of the transparent substrate component and the binder matrix component by using the solvent which dissolves the transparent substrate or causes the transparent substrate to swell as 30-90% by weight component of the entire solvent contained in the coating liquid for forming a low refractive index hard coat layer.

In the case where the solvent which dissolves the transparent substrate or causes the transparent substrate to swell is used only less than 30% by weight of the entire solvent contained in the coating liquid for forming a low refractive index hard coat layer, it becomes impossible to form an optically distinguishable localized layer. Whereas in the case where the solvent which dissolves the transparent substrate or causes the transparent substrate to swell is used more than 90% by weight of the entire solvent, there may be problems such as a hardness decrease of the anti-reflection film caused by an increase in thickness of the mixed layer, and an excessive haze generation due to an aggregation of low refractive index particles in the localized layer.

It is more preferable in the manufacturing method of the anti-reflection film of the present invention that 40-80% by weight of the entire solvent contained in the coating liquid for forming a low refractive index hard coat layer is a solvent which dissolves the transparent substrate or causes the transparent substrate to swell. It is still more preferable in the manufacturing method of the anti-reflection film of the present invention that 50-70% by weight of the entire solvent contained in the coating liquid for forming a low refractive index hard coat layer is a solvent which dissolves the transparent substrate or causes the transparent substrate to swell.

In addition, it is preferable in the manufacturing method of the anti-reflection film of the present invention that the time required for the solvent in the coating liquid for forming the low refractive index layer to evaporate to a level of 10% by weight or less in the coating liquid on the transparent substrate is in the range of 2-60 seconds. The solvent, herein, means the solvent mixture in which a solvent which dissolves the transparent substrate or causes the transparent substrate to swell is also included.

By setting the time for the solvent to evaporate to 10% by weight or less in the coating liquid coated on the transparent substrate to 2-60 seconds, it becomes possible to localize the low refractive index particles in the coating liquid to form the localized layer spending sufficient time so that the anti-reflection film of the present invention having the localized layer and the mixed layer is easily manufactured. In the case where it takes less than two seconds for the solvent in the coating liquid to reduce to 10% by weight or less, the localized layer may not be formed due to rapid drying of the coated layer. In addition, the low refractive index hard coat layer is formed continuously by a roll-to-roll system in the anti-reflection film of the present invention. If it takes more than 60 seconds for the solvent in the coating liquid to reduce to 10% by weight or less, it takes too much time to form the layer practically. When a single film production system is applied instead of the roll-to-roll system, it is similarly undesirable because of the long takt time and low productivity.

The amount of solvent contained in the coated layer can be estimated by measuring a weight. In addition, a solvent contained in the coated layer can also be measured by infrared monitoring.

In addition, it is preferable in the manufacturing method of the anti-reflection film of the present invention that the total amount of the solvent contained in the coating liquid for forming the low refractive index hard coat layer is in the range of 55-85% by weight. By adjusting the total amount of the solvent contained in the coating liquid into such a range, it becomes possible to ensure sufficient time to localize the low refractive index particles in the coated layer to form the localized layer and to easily manufacture the anti-reflection film with the localized layer and the mixed layer of the present invention. In the case where the amount of solvent in the coating liquid for forming the low refractive index hard coat layer is less than 55% by weight, it may be impossible to form the localized layer because of rapid drying of the coated layer. On the other hand, in the case where the amount of solvent in the coating liquid for forming the low refractive index hard coat layer exceeds 85% by weight, it is necessary to increase drying time, which is unsuitable for mass production.

In addition, it is preferable in the manufacturing method of the anti-reflection film of the present invention that the drying process of the coated layer which is supposed to be the low refractive index hard coat layer is performed under a solvent atmosphere in the concentration range 0.2-10 vol %. By drying the coated layer under a solvent atmosphere in the range of 0.2-10 vol %, it is possible to ensure sufficient time to localize the low refractive index particles in the coated layer to form the localized layer and to easily manufacture the anti-reflection film with the localized layer and the mixed layer. At this time, at least one solvent among solvents contained in the coating liquid for forming the low refractive index hard coat layer is used as a solvent of the drying atmosphere. In the case where the solvent atmosphere is thinner than 0.2 vol %, the coated layer may dry too rapidly to form the localized layer. On the other hand, in the case where the solvent atmosphere is thicker than 10 vol %, it is necessary to set a long drying time, which is unsuitable for mass production.

In addition in the manufacturing method of the anti-reflection film of the present invention, a drying process is performed after the coating liquid for forming the low refractive index hard coat layer is coated on the transparent substrate. It is preferable that this drying process includes a primary drying at a temperature in the range of 20-30° C. just after the coating of the coating liquid for forming the low refractive index hard coat layer. By setting the primary drying temperature in the range of 20-30° C., it is possible to ensure sufficient time to localize the low refractive index particles in the coated layer to form the localized layer and is it easily possible to manufacture the anti-reflection film having the localized layer and the intermediate layer of the present invention. In the case where the drying temperature exceeds 30° C., it may be impossible to form the localized layer because of rapid drying of the coated layer. On the other hand, in the case where the drying temperature is lower than 20° C., it is necessary to set a long drying time, which is unsuitable for continuous production. Since the primary drying alone may be insufficient, an appropriate heat drying at a drying temperature in the range of 50-150° C. is preferred to be added as a secondary drying after the primary drying.

In addition, it is preferable that the primary drying is performed for a time in the range of 2-60 seconds. If it takes less than 2 seconds to perform the primary drying, it may be impossible to form the localized layer because of rapid drying. In addition, the low refractive index hard coat layer is subsequently formed by a roll-to-roll system in the manufacturing method of the anti-reflection film of the present invention. If it takes more than 60 seconds to perform the primary drying, it is necessary to decrease a feeding rate and/or to arrange a long drying unit, which is unpractical.

A volatile solvent with a high boiling point is preferred to be used as a solvent contained in the coating liquid for forming the low refractive index hard coat layer. A solvent with a boiling point of 100° C. or higher is preferable and 200° C. or higher is more preferable. This is because the higher the boiling point, the easier the adjustment of primary drying time, which is essential for forming the intermediate layer and the intermediate layer, becomes.

In addition, it is preferable in the present invention that the solvent contained in the coating liquid for forming the low refractive index hard coat layer contains N-methylpyrrolidone when triacetyl cellulose is used as the transparent substrate. It becomes possible to easily manufacture the anti-reflection film of the present invention having the localized layer and the intermediate layer by adding N-methylpyrrolidone as a solvent contained in the coating liquid for forming the low refractive index hard coat layer because N-methylpyrrolidone has a high boiling point and is extremely compatible with triacetyl cellulose.

The anti-reflection film and its manufacturing method of the present invention are described further in detail.

Films or sheets made of various organic polymers can be used as the transparent substrate of the anti-reflection film in the present invention. For example, substrates which are ordinarily used for an optical component of a display device, specifically, an organic polymer of polyolefin such as polyethylene and polypropylene etc., polyester such as polyethylene terephthalate and polyethylene naphthalate etc., cellulose such as triacetyl cellulose, diacetyl cellulose and cellophane etc., a polyamide such as 6-nylon and 6,6-nylon etc., acrylate such as polymethyl methacrylate etc., polystyrene, polyvinyl chloride, polyimide, polyvinyl alcohol, polycarbonate, and/or ethylene vinyl alcohol etc. can be used considering their optical properties such as transparency and refractive index etc. along with other characteristics such as impact resistivity, heat resistance and durability etc. In particular, polyethylene terephthalate, triacetyl cellulose, polycarbonate and polymethyl methacrylate are desirable. Among them, a triacetyl cellulose film is preferred to be used when the anti-reflection film of the present invention is applied on an LCD because triacetyl cellulose has significantly small birefringence and good transparency.

It is preferable that the thickness of the transparent substrate is in the range of 25-200 µm, and in particular 40-80 µm is more preferable.

Moreover, functional materials obtained from these organic polymers by adding a known additive such as, for example, ultraviolet absorber, infrared absorber, plasticising agent, lubricant, colorant, antioxidant and flame retardant etc. can also be used. In addition, the transparent substrate is not necessarily made from only one of the organic polymers but also a mixture or a copolymer of two or more of these. The transparent substrate may have a stacked structure of a plurality of sub-layers.

Next, a forming method of the low refractive index hard coat layer is described. The low refractive index hard coat layer having a localized layer which acts as a low refractive index layer is formed by coating a coating liquid for forming a low refractive index hard coat layer which contains low refractive index particles, a solvent and a binder matrix forming material (in which an ionizing radiation curable material is included) on the transparent substrate to form a coated layer, followed by drying the coated layer and then irradiating ionizing radiation to cure the coated layer.

Particles made of low refractive index materials such as LiF, MgF, 3NaF.AlF, AlF (refractive index: 1.4), and $Na_3AlF_6$ (cryolite, refractive index: 1.33) etc. can be used as the low refractive index particles. In addition, particles having pores therein are preferably used as the low refractive index particles. Particles having pores therein have a significantly small refractive index because the refractive index of pores is presumed as that of air (almost equal to 1). Specifically, silica particles having pores inside can be used.

In addition, since particles having pores inside do not tend to disperse into the transparent substrate component, such particles are pushed aside from a part of the binder matrix forming material (=a portion which corresponds to the mixed layer and the intermediate layer) which blends together with the transparent substrate component so that the localized layer can be formed when the binder matrix forming material of the low refractive index hard coat layer seeps into the transparent substrate.

It is preferable that the low refractive index particles used in the low refractive index hard coat layer have a size in the range of 1-100 nm in diameter. If the size exceeds 100 nm, the transparency of the anti-reflection film is liable to decrease because the low refractive index hard coat layer becomes white due to strong light reflection by Rayleigh scattering. On the other hand, if the size is less than 1 nm, the low refractive index particles agglutinate resulting in problems such as uneven dispersion of the low refractive index particles in the low refractive index hard coat layer etc. A plurality of types of such low refractive index particles which differ in size or types of material etc., respectively, may be used although it is not necessary and only a single type of particles may also be used.

The binder matrix forming material for forming the low refractive index hard coat layer contains an ionizing radiation curable material. An acrylic material can be used as the ionizing radiation curable material. Monofunctional or polyfunctional acrylates (or methacrylates) such as acrylic (or methacrylic) ester of polyol, and urethane acrylates (or methacrylates) synthesized from a diisocyanate and a hydroxyester of a polyol and an acrylic (or methacrylic) acid etc. can be used as the acrylic material. Besides these, polyether resin, polyester resin, epoxy resin, alkyd resin, spiroacetal resin, polybutadiene resin and polythiol-polyene resin having an acrylic functional group can also be used as the ionizing radiation curable resin.

Acrylate (or methacrylate) in the present invention refers to both acrylate and methacrylate. For example, urethane acrylates (or methacrylates) means both urethane acrylates and urethane methacrylates.

The following materials are examples of monofunctional acrylate (or methacrylate): 2-hydroxyethyl acrylate (or methacrylate), 2-hydroxypropyl acrylate (or methacrylate), 2-hydroxybutyl acrylate (or methacrylate), n-butyl acrylate (or methacrylate), isobutyl acrylate (or methacrylate), t-butyl acrylate (or methacrylate), glycidyl acrylate (or methacrylate), acryloylmorpholine, N-vinylpyrrolidone, tetrahydrofurfuryl acrylate, cyclohexyl acrylate (or methacrylate), 2-ethylhexyl acrylate (or methacrylate), isobornyl acrylate (or methacrylate), isodecyl acrylate (or methacrylate), lauryl acrylate (or methacrylate), tridecyl acrylate (or methacrylate), cetyl acrylate (or methacrylate), stearyl acrylate (or methacrylate), benzyl acrylate (or methacrylate), 2-ethoxyethyl acrylate (or methacrylate), 3-methoxybutyl acrylate (or methacrylate), ethyl carbitol acrylate (or methacrylate), phosphoric acrylate (or methacrylate), (ethylene oxide)-modified phosphoric acrylate (or methacrylate), phenoxy acrylate (or methacrylate), (ethylene oxide)-modified phenoxy acrylate (or methacrylate), (propylene oxide)-modified phenoxy acrylate (or methacrylate), nonylphenol acrylate (or methacrylate), (ethylene oxide)-modified nonylphenol acrylate (or methacrylate), (propylene oxide)-modified nonylphenol acrylate (or methacrylate), methoxydiethylene glycol acrylate (or methacrylate), methoxypolyethylene glycol acrylate (or methacrylate), methoxypropylene glycol acrylate (or methacrylate), 2-acryloyl (or methacryloyl) oxyethyl-2-hydroxypropyl phthalate, 2-hydroxyl-3-phenoxy propyl acrylate (or methacrylate), 2-acryloyl (or methacryloyl) oxyethyl hydrogen phthalate, 2-acryloyl (or methacryloyl) oxypropyl hydrogen phthalate, 2-acryloyl (or methacryloyl) oxypropyl hexahydrohydrogen phthalate, 2-acryloyl (or methacryloyl) oxypropyl tetrahydrohydrogen phthalate, dimethylaminoethyl acrylate (or methacrylate), trifluoroethyl acrylate (or methacrylate), tetrafluoropropyl acrylate (or methacrylate), hexafluoropropyl acrylate (or methacrylate), octafluoropropyl acrylate (or methacrylate), 2-adamantane, and an adamantane derivative monoacrylate (or methacrylate) such as adamantyl acrylate (or methacrylate) having monovalent monoacrylate (or methacrylate) which is derived from adamantane diol etc.

The following materials are examples of difunctional acrylate (or methacrylate): ethylene glycol diacrylate (or methacrylate), diethylene glycol diacrylate (or methacrylate), butane diol diacrylate (or methacrylate), hexanediol diacrylate (or methacrylate), nonanediol diacrylate (or methacrylate), ethoxylated hexanediol diacrylate (or methacrylate), propoxylated hexanediol diacrylate (or methacrylate), polyethylene glycol diacrylate (or methacrylate), tripropylene glycol diacrylate (or methacrylate), polypropylene glycol diacrylate (or methacrylate), neopentyl glycol diacrylate (or methacrylate), ethoxylated neopentyl glycol diacrylate (or methacrylate), and hydroxypivalic neopentyl glycol diacrylate (or methacrylate) etc.

The following materials are examples of acrylate (or methacrylate) having three or more acrylic functional groups: trifunctional acrylates (or methacrylates) such as trimethylolpropane triacrylate (or methacrylate), ethoxylated trimethylolpropane triacrylate (or methacrylate), propoxylated trimethylolpropane triacrylate (or methacrylate), tris(2-hydroxyethyl)isocyanate triacrylate (or methacrylate) and glycerin triacrylate (or methacrylate) etc., acrylates (or methacrylates) with three acrylic groups such as pentaerythritol triacrylate (or methacrylate), dipentaerythritol triacrylate (or methacrylate) and ditrimethylolpropane triacrylate (or methacrylate) etc., polyfunctional acrylates (or methacrylates) with more than three acrylic groups such as pentaerythritol tetraacrylate (or methacrylate), ditrimethylolpropane tetraacrylate (or methacrylate), dipentaerythritol tetraacrylate (or methacrylate), dipentaerythritol pentaacrylate (or methacrylate), ditrimethylolpropane pentaacrylate (or methacrylate), dipentaerythritol hexaacrylate (or methacrylate) and ditrimethylolpropane hexaacrylate (or methacrylate) etc., and polyfunctional acrylates (or methacrylates) which is obtained from these acrylates (or methacrylates) by substituting any part of these with an alkyl group or ε-caprolactone etc.

It is also possible to use polyfunctional urethane acrylates as the acrylic material. The urethane acrylates can be obtained by a reaction of polyol, polyvalent isocyanate and acrylate having a hydroxyl group. Although UA-306H, UA-306T and UA-306I etc. (made by Kyoeisha Chemical Co., Ltd.), UV-1700B, UV-6300B, UV-7600B, UV-7605B, UV-7640B and UV-7650B etc. (made by Nippon Synthetic Chemical Industry Co., Ltd.), U-4HA, U-4HA, U-6HA, UA-100H, U-6LPA, U-15HA, UA-32P and U-324A etc. (made by Shin-Nakamura Chemical Co., Ltd.), Ebecryl-1290, Ebecryl-1290K and Ebecryl-5129 etc. (made by Daicel-UCB Co., Ltd.), UN-3220HA, UN-3220HB, UN-3220HC and UN-3220HS etc. (made by Negami Chemical industrial Co., Ltd.) are specific examples, the present invention is not limited to these.

Besides these, polyether resin, polyester resin, epoxy resin, alkyd resin, spiroacetal resin, polybutadiene resin and polythiol-polyene resin etc. which have an acrylic functional group can also be used as the ionizing radiation curable resin.

In addition, in the case where the coating liquid for forming the low refractive index hard coat layer is cured by ultraviolet light, a photopolymerization initiator is added to the coating liquid for forming the low refractive index hard coat layer. The photopolymerization initiator is an additive which generates radicals as ultraviolet light is irradiated. For example, acetophenone, benzoin, benzophenone, phosphine oxide, ketals, anthraquinone and thioxanthone can be used as the photopolymerization initiator. In addition, the amount of photopolymerization initiator added to the coating liquid is preferably in the range of 0.1-10 parts by weight, and is more preferably 1-7 parts by weight relative to 100 parts by weight of ionizing radiation curable material.

The coating liquid for forming the low refractive index hard coat layer contains a solvent. A solvent which dissolves the transparent substrate or causes the transparent substrate to swell is used by a ratio in the range of 30-80 wt % relative to the total solvent in the coating liquid for forming the low refractive index hard coat layer of the present invention.

Ethers such as dibutyl ether, dimethoxymethane, dimethoxyethane, diethoxyethane, propylene oxide, dioxane, dioxolane, trioxane, tetrahydrofuran, anisole and phenetol etc., a certain type of ketones such as acetone, methyl ethyl ketone, diethyl ketone, dipropyl ketone, diisobutyl ketone, cyclopentanone, cyclohexanone and methylcyclohexanone etc., esters such as ethyl formate, propyl formate, n-pentyl formate, methyl acetate, ethyl acetate, methyl propionate, ethyl propionate, n-pentyl acetate and γ-butyrolactone etc., cellosolves such as methyl cellosolve, cellosolve, butyl cellosolve and cellosolve acetate etc., N-methyl-2-pyrrolydone (N-methylpyrrolydone) and dimethyl carbonate can be used as the solvent which dissolves the transparent substrate or causes the transparent substrate to swell when triacetyl cellulose is used as the transparent substrate. One of these or any combination of a plurality of these can be used as the solvent.

Alcohols such as ethanol and isopropyl alcohol etc., aromatic hydrocarbons such as toluene, xylene and cyclohexylbenzene etc., hydrocarbons such as n-hexane and cyclohexane etc., and a certain type of ketones such as methyl isobutyl ketone, methyl butyl ketone and diacetone alcohol etc. are a solvent which does not dissolve triacetyl cellulose nor cause triacetyl cellulose to swell. One of these or any combination of a plurality of these can be used as the solvent.

In addition, the binder matrix forming material may also include a thermoplastic resin besides the ionizing radiation curable material. Cellulose derivatives such as acetyl cellulose, nitrocellulose, acetyl butyl cellulose, ethylcellulose and methylcellulose etc., vinyl acetate and its copolymers, vinyl chloride and its copolymers, vinyl resins such as vinylidene chloride and its copolymers, acetal resins such as polyvinyl formal and polyvinyl butylal etc., acrylic resins and their copolymers, methacrylic resins and their copolymers, polystyrene resin, polyamide resin, linear polyester resins and polycarbonate resins etc. can be used as the thermoplastic resin. It is possible to prevent the resultant anti-reflection film from curling by adding a thermoplastic resin.

In addition, polyacetylene, polyaniline, polythiophene, polypyrrole, polyphenylene sulfide (PPS), poly(1,6-heptadiyne), polybiphenylene(polyparaphenylene), poly(paraphenylene sulfide), polyphenylacetylene, poly(2,5-phenylene) and a derivative of these, and a blend of these (including a blend of derivatives of these) can be used as the conductive polymer (electron conducting polymer) contained in the coating liquid for forming the low refractive index hard coat layer.

In addition, a surface conditioner, a refractive index adjusting agent, adhesion improving agent and a curing agent etc. may be added as an additive to the coating liquid for forming the low refractive index hard coat layer.

The coating liquid for forming the low refractive index hard coat layer which contains components described above is coated on the transparent substrate to form a coated layer. A coating method using a roll coater, a reverse roll coater, a gravure coater, a micro gravure coater, a knife coater, a bar coater, a wire bar coater, a die coater and a dip coater can be employed in order to coat the coating liquid for forming the low refractive index hard coat layer on the transparent substrate.

Subsequently, the coated layer which is to be the low refractive index hard coat layer on the transparent substrate is removed with the solvent contained in the coated layer by a drying process. Heating, sending air or hot air etc. can be employed as the drying method at this time.

The low refractive index hard coat layer is formed by irradiating the coated layer obtained by coating the coating liquid for forming the low refractive index hard coat layer on the transparent substrate with ionizing radiation. Ultraviolet radiation or electron beam can be used as the ionizing radiation. In the case of ultraviolet curing, a light source such as a high-pressure mercury lamp, a low-pressure mercury lamp, an ultrahigh-pressure mercury lamp, a metal halide lamp, a carbon arc, or a xenon arc can be used. Further, in the case of electron beam curing, an electron beam emitted from various electron beam accelerators such as a Cockroft-Walton accelerator, a Van de Graaff accelerator, a resonance transformer-type accelerator, an insulating core transformer-type accelerator, a linear accelerator, a dynamitron accelerator, or a high-frequency accelerator can be used. The electron beam preferably has energy of 50-1000 keV. An electron beam having energy of 100-300 keV is more preferable.

The low refractive index hard coat layer is formed continuously in a roll-to-roll system. A transparent substrate in a web-form is continuously transferred from a wound-off reel to a wound-on reel by way of a coating unit, a drying unit and an ionizing radiation irradiating unit, whereby a low refractive index hard coat layer is continuously formed.

EXAMPLES

Example 1

Transparent Substrate

An 80 μm thick triacetyl cellulose film (refractive index: 1.49) was prepared as the transparent substrate.
<Formation of Low Refractive Index Hard Coat Layer>
6.0 parts by weight of a dispersion liquid of low refractive index silica particles having pores therein (primary particle diameter: 30 nm, solid content ratio: 20 wt %, dispersion solvent:isopropyl alcohol), 7.8 parts by weight of dipentaerythritol hexaacrylate (DPHA), 23.3 parts by weight of pentaerythritol tetraacrylate (PETA) and 7.8 parts by weight of urethane acrylate UA-306T (made by Kyoeisha chemical Co., Ltd.) as the ionizing radiation curable material, 2.0 parts by weight of Irgacure 184 (by Ciba Japan) as the photopolymerization initiator, and 55.2 parts by weight of a solvent mixture of methyl ethyl ketone, isopropyl alcohol and diacetone alcohol having a blend ratio of 6:2:2 as the solvent were blended together to prepare a coating liquid for forming a low refractive index hard coat layer with a solid content ratio of 40 wt % by weight.

The resultant coating liquid was coated on the transparent substrate by a wire bar coater to form a coated layer. Then the coated layer received room temperature drying at 25° C. for 30 seconds under a semi-encapsulated condition with 2-5 vol % of the solvent atmosphere (primary drying process). It took 4 seconds for the solvent in the coated layer on the transparent substrate to evaporate off to a level below 10 wt % or less by this room temperature drying. After the room temperature drying, the coated layer was dried in an oven at 80° C. for one minute (secondary drying process). After drying, an ultraviolet irradiation with a 400 mJ/cm² of light exposure amount was performed on the coated layer using a conveyer type UV curing instrument so that a 5 μm thick low refractive index hard coat layer was formed. In this way, an anti-reflection film having a low refractive index hard coat layer was formed on the transparent substrate.

Example 2

Transparent Substrate

An 80 μm thick triacetyl cellulose film (refractive index: 1.49) was prepared as the transparent substrate.
<Formation of Low Refractive Index Hard Coat Layer>
2.0 parts by weight of a dispersion liquid of low refractive index silica particles having pores therein (primary particle diameter: 30 nm, solid content ratio: 20 wt %, dispersion solvent:isopropyl alcohol), 4.9 parts by weight of dipentaerythritol hexaacrylate (DPHA), 14.7 parts by weight of pentaerythritol tetraacrylate (PETA) and 4.9 parts by weight of urethane acrylate UA-306T (made by Kyoeisha chemical Co., Ltd.) as the ionizing radiation curable material, 2.0 parts by weight of Irgacure 184 (by Ciba Japan) as the photopolymerization initiator, 16.7 parts by weight of conductive polymer Baytron P CH 8000 (solid content ratio: 3%), 0.5 parts by weight of modified silicone oil TSF44 (made by GE Toshiba silicone Ltd.), and 56.6 parts by weight of a solvent mixture of methyl ethyl ketone, isopropyl alcohol and diacetone alcohol having a blend ratio of 6:2:2 as the solvent were blended together to prepare a coating liquid for forming a low refractive index hard coat layer with a solid content ratio of 26 wt % by weight.

The resultant coating liquid was coated on the transparent substrate by a wire bar coater to form a coated layer. Then the coated layer received room temperature drying at 25° C. for 30 seconds under an open condition with 0.1 vol % or lower of the solvent atmosphere (primary drying process). It took 3 seconds for the solvent in the coated layer on the transparent substrate to evaporate off to a level below 10 wt % or less by this room temperature drying. After the room temperature drying, the coated layer was dried in an oven at 80° C. for one minute (secondary drying process). After drying, an ultraviolet irradiation with a 400 mJ/cm² of light exposure amount was performed on the coated layer using a conveyer type UV curing instrument so that a 5 μm thick low refractive index hard coat layer was formed. In this way, an anti-reflection film having a low refractive index hard coat layer on the transparent substrate was formed.

Example 3

Transparent Substrate

An 80 μm thick triacetyl cellulose film (refractive index: 1.49) was prepared as the transparent substrate.
<Formation of Low Refractive Index Hard Coat Layer>
6.0 parts by weight of a dispersion liquid of magnesium fluoride (MgF$_2$) (primary particle diameter: 20 nm, solid content ratio: 20 wt %, dispersion solvent:isopropyl alcohol), 7.8 parts by weight of dipentaerythritol hexaacrylate (DPHA), 23.3 parts by weight of pentaerythritol tetraacrylate (PETA) and 7.8 parts by weight of urethane acrylate UA-306T (made by Kyoeisha chemical Co., Ltd.) as the ionizing radiation curable material, 2.0 parts by weight of Irgacure 184 (by Ciba Japan) as the photopolymerization initiator, and 55.2 parts by weight of a solvent mixture of methyl ethyl ketone, N-methylpyrrolidone and diacetone alcohol having a blend ratio of 5:2:3 as the solvent were blended together to prepare a coating liquid for forming a low refractive index hard coat layer with a solid content ratio of 40 wt % by weight.

The resultant coating liquid was coated on the transparent substrate by a wire bar coater to form a coated layer. Then the coated layer received room temperature drying at 25° C.

for 30 seconds under an open condition with 0.1 vol % or lower of the solvent atmosphere (primary drying process). It took 25 seconds for the solvent in the coated layer on the transparent substrate to evaporate off to a level below 10 wt % or less by this room temperature drying. After the room temperature drying, the coated layer was dried in an oven at 80° C. for one minute (secondary drying process). After drying, an ultraviolet irradiation with a 400 mJ/cm$^2$ of light exposure amount was performed on the coated layer using a conveyer type UV curing instrument so that a 5 μm thick low refractive index hard coat layer was formed. In this way, an anti-reflection film having a low refractive index hard coat layer on the transparent substrate was formed.

Comparative Example 1

Transparent Substrate

An 80 μm thick triacetyl cellulose film (refractive index: 1.49) was prepared as the transparent substrate.
<Formation of Hard Coat Layer>
10 parts by weight of dipentaerythritol hexaacrylate (DPHA), 30 parts by weight of pentaerythritol tetraacrylate (PETA) and 10 parts by weight of urethane acrylate UA-306T (made by Kyoeisha chemical Co., Ltd.) as the ionizing radiation curable material, 2.5 parts by weight of Irgacure 184 (by Ciba Japan) as the photopolymerization initiator, and 25 parts by weight of methyl ethyl ketone and 25 parts by weight of butyl acetate as the solvent were blended together to prepare a coating liquid for forming a hard coat layer. The resultant coating liquid for forming a hard coat layer was coated on the transparent substrate by a wire bar coater to form a coated layer. Then the coated layer was dried in an oven at 80° C. for 1 minute. After drying, an ultraviolet irradiation with a 400 mJ/cm$^2$ of light exposure amount was performed on the coated layer using a conveyer type UV curing instrument so that a 5 μm thick hard coat layer was formed on the transparent substrate.
<Formation of Antistatic Layer>
Tetraethoxysilane as an organosilicon compound raw material was added with isopropyl alcohol and 0.1 N hydrochloric acid and hydrolyzed to obtain a solution containing tetraethoxysilane polymer. This solution was mixed with antimony doped tin oxide (ATO) particles which have a primary diameter of 8 nm and added with isopropyl alcohol to obtain a coating liquid for forming an antistatic layer which contains 2.5 parts by weight of tetraethoxysilane polymer and 2.5 parts by weight of antimony doped tin oxide (ATO) particles per 100 parts by weight of the coating liquid. The resultant coating liquid for forming an antistatic layer was coated by a wire bar coater onto the hard coat layer which was preliminarily alkali treated, and then dried in an oven at 120° C. for one minute so that an antistatic layer having optical thickness of ¼ wavelength of the visible light was obtained.
<Formation of Low Refractive Index Layer>
A 95:5 molar ratio mixture of tetraethoxysilane and 1H, 1H, 2H, 2H-perfluorooctyl trimethoxysilane as organosilicon compounds were admixed with isopropyl alcohol and 0.1 N hydrochloric acid and hydrolyzed to obtain a solution containing an organosilicon compound polymer. This solution was blended with a dispersion solution of low refractive index silica particles having pores therein (primary particle diameter: 30 nm, solid content: 20% by weight) and further added with isopropyl alcohol to obtain coating liquid for forming a low refractive index layer which contains 2.0 parts by weight of an organosilicon compound and 2.0 parts by weight of low refractive index silica particles per 100 parts by weight. The coating liquid for forming a low refractive index layer was coated onto the antistatic layer by a wire bar coater and dried in an oven at 120° C. for one minute so that a low refractive index layer having optical thickness of ¼ wavelength of the visible light was obtained. In this way, an anti-reflection film having a transparent substrate, a hard coat layer, an antistatic layer and a low refractive index layer in order was formed.

Comparative Example 2

Transparent Substrate

An 80 μm thick triacetyl cellulose film (refractive index: 1.49) was prepared as the transparent substrate.
<Formation of Antistatic Hard Coat Layer>
33.3 parts by weight of a dispersion liquid of antimony doped tin oxide particles (ATO, average particles diameter: 8 nm, solid content ratio: 30% by weight, dispersion solvent: isopropyl alcohol) as the conductive particles, 8.3 parts by weight of dipentaerythritol hexaacrylate (DPHA), 25 parts by weight of pentaerythritol tetraacrylate (PETA) and 8.3 parts by weight of urethane acrylate UA-306T (made by Kyoeisha chemical Co., Ltd.) as the ionizing radiation curable material, 2.1 parts by weight of Irgacure 184 (by Ciba Japan) as the photopolymerization initiator, and 23 parts by weight of toluene as the solvent were blended together to prepare a coating liquid for forming an antistatic hard coat layer. The resultant coating liquid for forming an antistatic hard coat layer was coated on a triacetyl cellulose film by a wire bar coater to form a coated layer. Then the coated layer on the triacetyl cellulose film was dried in an oven at 80° C. for 1 minute. After drying, an ultraviolet irradiation with a 400 mJ/cm$^2$ of light exposure amount was performed on the coated layer using a conveyer type UV curing instrument so that a 5 μm thick antistatic hard coat layer was formed on the transparent substrate.
<Formation of Low Refractive Index Layer>
A 95:5 molar ratio mixture of tetraethoxysilane and 1H, 1H, 2H, 2H-perfluorooctyl trimethoxysilane as organosilicon compounds were admixed with isopropyl alcohol and 0.1 N hydrochloric acid and hydrolyzed to obtain a solution containing an organosilicon compound polymer. This solution was blended with a dispersion solution of low refractive index silica particles having pores therein (primary particle diameter: 30 nm, solid content: 20% by weight) and further added with isopropyl alcohol to obtain coating liquid for forming a low refractive index layer which contains 2.0 parts by weight of the organosilicon compound and 2.0 parts by weight of low refractive index silica particles per 100 parts by weight. The coating liquid for forming a low refractive index layer was coated onto the antistatic hard coat layer by a wire bar coater and dried in an oven at 120° C. for one minute so that a low refractive index layer having optical thickness of ¼ wavelength of the visible light was obtained. In this way, an anti-reflection film having an antistatic hard coat layer and a low refractive index layer in order on a transparent substrate was formed.

Comparative Example 3

Transparent Substrate

An 80 μm thick triacetyl cellulose film (refractive index: 1.49) was prepared as the transparent substrate.
<Formation of Low Refractive Index Hard Coat Layer>
6.0 parts by weight of a dispersion liquid of low refractive index silica particles having pores therein (primary particle diameter: 30 nm, solid content ratio: 20 wt %, dispersion solvent:isopropyl alcohol), 7.8 parts by weight of dipentaerythritol hexaacrylate (DPHA), 23.3 parts by weight of pentaerythritol tetraacrylate (PETA) and 7.8 parts by weight of urethane acrylate UA-306T (made by Kyoeisha chemical Co., Ltd.) as the ionizing radiation curable material, 2.0 parts by weight of Irgacure 184 (by Ciba Japan) as the photopolymerization initiator, and 55.2 parts by weight of toluene as the solvent were blended together to prepare a coating liquid for forming a low refractive index hard coat layer with a solid content ratio of 40 wt % by weight.

The resultant coating liquid was coated on the transparent substrate by a wire bar coater to form a coated layer. Then the coated layer received room temperature drying at 25° C. for 30 seconds under a semi-encapsulated condition with 2-5 vol % of the solvent atmosphere (primary drying process). It took 4 seconds for the solvent in the coated layer on the transparent substrate to evaporate off to a level below 10 wt % or less by this room temperature drying. After the room temperature drying, the coated layer was dried in an oven at 80° C. for one minute (secondary drying process). After drying, an ultraviolet irradiation with a 400 mJ/cm$^2$ of light exposure amount was performed on the coated layer using a conveyer type UV curing instrument so that a 5 μm thick low refractive index hard coat layer was formed. In this way, an anti-reflection film having a low refractive index hard coat layer on the transparent substrate was formed.

Comparative Example 4

Transparent Substrate

An 80 μm thick triacetyl cellulose film (refractive index: 1.49) was prepared as the transparent substrate.
<Formation of Low Refractive Index Hard Coat Layer>
5.0 parts by weight of a dispersion liquid of low refractive index silica particles having pores therein (primary particle diameter: 30 nm, solid content ratio: 20 wt %, dispersion solvent:isopropyl alcohol), 4.7 parts by weight of dipentaerythritol hexaacrylate (DPHA), 14.1 parts by weight of pentaerythritol tetraacrylate (PETA) and 4.7 parts by weight of urethane acrylate UA-306T (made by Kyoeisha chemical Co., Ltd.) as the ionizing radiation curable material, 1.5 parts by weight of Irgacure 184 (by Ciba Japan) as the photopolymerization initiator, and 69.0 parts by weight of a solvent mixture of methyl ethyl ketone and isopropyl alcohol having a blend ratio of 3:7 as the solvent were blended together to prepare a coating liquid for forming a low refractive index hard coat layer with a solid content ratio of 25 wt % by weight.

The resultant coating liquid was coated on the transparent substrate by a wire bar coater to form a coated layer. Then the coated layer received a room temperature drying at 25° C. for 30 seconds under an open condition with 0.1 vol % or lower of the solvent atmosphere (primary drying process). It took less than 2 seconds for the solvent in the coated layer on the transparent substrate to evaporate off to a level below 10 wt % or less by this room temperature drying. After the room temperature drying, the coated layer was dried in an oven at 80° C. for one minute (secondary drying process). After drying, an ultraviolet irradiation with a 400 mJ/cm$^2$ of light exposure amount was performed on the coated layer using a conveyer type UV curing instrument so that a 5 μm thick low refractive index hard coat layer was formed. In this way, an anti-reflection film having a low refractive index hard coat layer on the transparent substrate was formed.

The resultant anti-reflection films were measured and evaluated as described below.

<<Spectral Reflectance>>

The anti-reflection films obtained in the examples and comparative examples were painted black with matte-black spray on the opposite side from the surface on which the low refractive index hard coat layer was formed. After painting, spectral reflectance on the low refractive index hard coat layer surface at 5 degrees of incident angle was measured using an automated spectral photometer (U-4000 made by Hitachi Ltd.) under a condition of C light source and 2 degrees of field of view. Then, the existence of the localized layer in the low refractive index hard coat layer, the optical thickness of the localized layer, the refractive index of the localized layer, the refractive index of the intermediate layer were obtained from the resultant spectral reflectance curve by an optical simulation method. In addition, the existence of the mixed layer was confirmed from the spectral reflectance curve. The refractive index and optical thickness of the antistatic layer, and the refractive index and the optical thickness of the low refractive index layer were obtained with regard to the film of the comparative example 1.

<<Confirmation of Mixed Layer>>

Cross section samples were made by means of a microtome with respect to the anti-reflection films obtained in the example 1 to example 3. It was observed that each of the cross section samples had an unclear boundary with their transparent substrates, which indicated that a mixed layer was formed. Moreover, it was confirmed from the profile that the mixed layer had a thickness equal to or more than 0.5 μm.

Table 1A and 1B show the results concerning the existence of the localized layer and the mixed layer in the low refractive index hard coat layer, the refractive index of the intermediate layer, the refractive index of the localized layer, and the optical thickness of the localized layer. It is noted that with regards to the column of the refractive index of the intermediate layer, the refractive index of the hard coat layer was filled in the comparative example 1 and the refractive index of the antistatic hard coat layer is filled in the comparative example 2.

TABLE 1A

| | Low refractive index hard coat layer (or Hard coat layer) | | | |
|---|---|---|---|---|
| | Existence of | Intermediate layer | Localized layer | |
| | localized layer and mixed layer | Refractive index | Refractive index | Optical thickness (nm) |
| Example 1 | Exist | 1.52 | 1.39 | 138 |
| Example 2 | Exist | 1.52 | 1.37 | 130 |
| Example 3 | Exist | 1.52 | 1.42 | 130 |
| Comparative example 1 | No localized layer | 1.52[‡1] | — | — |
| Comparative example 2 | Not exist | 1.58[‡2] | — | — |
| Comparative example 3 | Not exist | 1.54[‡3] | Not formed | Not formed |

TABLE 1A-continued

| | Low refractive index hard coat layer (or Hard coat layer) | | | |
|---|---|---|---|---|
| | Existence of localized layer and mixed layer | Intermediate layer Refractive index | Localized layer Refractive index | Optical thickness (nm) |
| Comparative example 4 | Exist, but insufficient | 1.52 | 1.48 | 1200 |

[†1]Refractive index of hard coat layer.
[†2]Refractive index of antistatic hard coat layer.
[†3]Refractive index of low refractive index hard coat layer.

TABLE 1B

| | Antistatic layer | | Low refractive index layer | | Antistatic function |
|---|---|---|---|---|---|
| | Refractive index | Optical thickness (nm) | Refractive index | Optical thickness (nm) | |
| Example 1 | — | — | — | — | — |
| Example 2 | — | — | — | — | Provided |
| Example 3 | — | — | — | — | — |
| Comparative example 1 | 1.60 | 125 | 1.37 | 125 | Provided |
| Comparative example 2 | — | — | 1.37 | 125 | Provided |
| Comparative example 3 | — | — | — | — | — |
| Comparative example 4 | — | — | — | — | — |

Table 2 summarizes each of the content ratios (% by weight) of the low refractive index particles in the low refractive index hard coat layer, amount (g/m²) of the low refractive index particles contained in a unit area of the low refractive index hard coat layer, the solvent ratio (% by weight) in the coating liquid for forming the low refractive index hard coat layer, and the amount ratio (% by weight) of the solvent which dissolves the transparent substrate or causes the transparent substrate to swell relative to the entire solvent in the coating liquid as the content ratio of the low refractive index particles (wt %), content amount of the low refractive index particles (g/m²), solvent ratio in the coating liquid (wt %), and ratio of the solvent for dissolving/ swelling to the entire solvent (wt %), respectively. It is noted that as for the column of the content ratio of the low refractive index particles (wt %), the content ratio of the conductive particles (the antistatic (hard coat) layer) and the content ratio of the low refractive index particles (low refractive index layer) were filled in the comparative example 1 and comparative example 2. The values in the content amount of the low refractive index particles (g/m²) were calculated under the assumption that 1.2 was the specific gravity of the low refractive index hard coat layer.

TABLE 2A

| | Low refractive index hard coat layer | | Coating liquid for forming a low refractive index hard coat layer | |
|---|---|---|---|---|
| | Content ratio of the low refractive index particles (wt %) | Content amount of the low refractive index particles (g/m²) | Solvent ratio in the coating liquid (wt %) | Ratio of the solvent for dissolving/ swelling to the entire solvent (wt %) |
| Example 1 | 3.0 | 0.18 | 60 | 55 |
| Example 2 | 0.95 | 0.06 | 74 | 45 |
| Example 3 | 3.0 | 0.18 | 60 | 64 |
| Comparative example 1 | Antistatic layer: 2.5 Low refractive index layer: 2.0 | — | — | — |
| Comparative example 2 | Antistatic hard coat layer: 19.4 Low refractive index layer: 2.0 | — | — | — |
| Comparative example 3 | 3.0 | 0.18 | 60 | — |
| Comparative example 4 | 4.1 | 0.25 | 75 | 28 |

<<Average Luminous Reflectance and Reflection Hue>>

The anti-reflection films obtained in the examples and comparative examples were painted black with matte-black spray on the opposite side from the surface on which the low refractive index hard coat layer was formed. After painting, spectral reflectance on the low refractive index layer surface at 5 degrees of incident angle was measured using an automated spectral photometer (U-4000 made by Hitachi Ltd.) under a condition of C light source and 2 degrees of field of view. Then, average luminous reflectance (Y %) and reflection hue (a*, b*) are calculated from the result of the spectral reflectance. Photopic relative luminous efficiency is used as the relative luminous efficiency.

<<Haze (H) and Parallel Light Transmittance>>

The anti-reflection films obtained in the examples and comparative examples were measured for haze (H) and parallel light transmittance by a haze turbidimeter instrument (NDH-2000 made by Nippon Denshoku Industries Co., Ltd.).

<<Surface Resistivity>>

The surface resistivities of the low refractive index layers of the anti-reflection films were measured conforming to JIS (Japanese Industrial Standards) K6911 by a high resistivity measurement meter (Hiresta MCP-HT260 made by DIA Instruments Co., Ltd.).

<<Color Unevenness and Interference Fringe>>

Light of a fluorescent lamp falling in and reflected on the surface of the low refractive index hard coat layer or the low refractive index layers of the anti-reflection films obtained in the examples and the comparative examples was observed and checked if color unevenness and/or interference fringe appeared.

Table 3A and 3B show the measurement results of the average luminous reflectance, the parallel light transmittance, the haze, the reflection hue, the surface resistivity and the binder matrix component ratio in the intermediate layer as well as the evaluation results of the color unevenness and the interference fringe. In the comparative example 2 and 3, the color unevenness was not evaluated because the interference fringes were severely strong.

TABLE 3A

|  | Average luminous reflectance (%) | Parallel light transmittance (%) | Haze (%) | Reflection hue a* | Reflection hue b* |
|---|---|---|---|---|---|
| Example 1 | 1.5 | 95.2 | 0.2 | 2.10 | −2.73 |
| Example 2 | 1.2 | 95.0 | 0.2 | 2.53 | −1.05 |
| Example 3 | 2.0 | 94.3 | 0.2 | 1.27 | −0.33 |
| Comparative example 1 | 0.5 | 96.0 | 0.1 | 10.50 | −0.45 |
| Comparative example 2 | 1.1 | 85.2 | 0.6 | 2.60 | −0.81 |
| Comparative example 3 | 4.0 | — | — | 0.00 | −0.01 |
| Comparative example 4 | 3.8 | — | — | 1.53 | 0.30 |

TABLE 3B

|  | Surface resistivity ($\Omega/\square$) | Color unevenness evaluation | Interference fringe evaluation |
|---|---|---|---|
| Example 1 | >1.0 × 10$^{13}$ | Did not appear | Did not appear |
| Example 2 | 4.0 × 10$^{9}$ | Did not appear | Did not appear |
| Example 3 | >1.0 × 10$^{13}$ | Did not appear | Did not appear |
| Comparative example 1 | 1.2 × 10$^{10}$ | Appeared | Did not appear |
| Comparative example 2 | 2.0 × 10$^{10}$ | — | Appeared |
| Comparative example 3 | >1.0 × 10$^{13}$ | — | Appeared |
| Comparative example 4 | >1.0 × 10$^{13}$ | — | Appeared |

">1.0 × 10$^{13}$" means "larger than 1.0 × 10$^{13}$".

The comparative example 1 is an example in which the hard coat layer, the antistatic layer and the low refractive index layer were separately formed. In this example, color unevenness caused by the thickness unevenness of the hard coat layer, the antistatic layer and the low refractive index layer appeared.

The comparative example 2 and 3 are examples in which the coating liquid for forming the antistatic hard coat layer contained no solvents which dissolved the transparent substrate or caused the transparent substrate to swell. In addition, the comparative example 2 is an example in which the antistatic hard coat layer which contained conductive particles and the low refractive index layer which contained low refractive index particles were formed in order. In the comparative example 2, although the surface resistivity was sufficiently high, the parallel light transmittance heavily decreased and the haze was large because of a large amount of added conductive particles. In the comparative example 3, no mixed layer and no localized layer were formed because the amount ratio (% by weight) of the solvent which dissolves the transparent substrate or causes the transparent substrate to swell relative to the entire solvent in the coating liquid for forming the low refractive index hard coat layer was low. As a result, interference caused by a difference in refractive index between the resultant layer and the substrate was generated. In addition, sufficient anti-reflection properties were not provided, either.

In the comparative example 4, the interference fringe was generated since the localized layer was formed insufficiently and the thickness was inappropriate although at least the mixed layer and the localized layer were formed.

On the other hand, the anti-reflection films of the examples were provided with excellent optical properties at a low production cost. The production costs were saved more in the anti-reflection films of the examples than those in the case where the low refractive index layer was formed separately (the comparative example 1 and comparative example 2). In addition, it was possible to improve optical properties by making the localized layer act as a low refractive index layer in the anti-reflection films of the examples. Specifically, it was possible to make the anti-reflection films have excellent anti-reflection properties, no interference fringe and color unevenness, and a small reflection hue. Especially the anti-reflection film obtained in the example 2 had sufficient antistatic properties as well as excellent optical properties and no interference fringe and color unevenness. Moreover, the anti-reflection film of the present invention had a high level of parallel light transmittance and a low level of haze. Hence, the anti-reflection film of the present invention is able to provide a display device with anti-reflection properties without affecting the contrast adversely so as to be preferably applied on the display surface.

What is claimed is:
1. A method for manufacturing an anti-reflection film which has a low refractive index hard coat layer on a transparent substrate comprising:
    preparing a coating liquid for forming said low refractive index hard coat layer comprising low refractive index particles, a binder matrix which includes an ionizing radiation curable material, and solvents;
    coating said coating liquid for forming said low refractive index hard coat layer to form a coated layer on said transparent substrate;
    drying said coated layer under an atmosphere of 0.2-10 vol % solvent vapor, the solvent vapor being from one or more of the solvents of the coating liquid; and
    irradiating said coated layer with ionizing radiation to form said low refractive index hard coat layer, said solvents in said coating liquid for forming said low refractive index hard coat layer including a solvent which dissolves said transparent substrate or causes said transparent substrate to swell by a ratio in the range of 30-90 wt %, said low refractive index hard coat layer including a mixed layer in which said binder matrix and a component of said transparent substrate blend together with a gradient and a localized layer which comprises said low refractive index particles and said binder matrix, said mixed layer being optically indistinguishable, and said localized layer being optically distinguishable and having a refractive index in the range of 1.29-1.43 and an optical thickness in the range of 100-200 nm;
    wherein said "optically distinguishable" means such a state that an interference peak is detected when a spectral reflectance of the anti-reflection film is measured at wavelengths in the range of 380-800 nm with 5 degrees of incident angle and an optical simulation is performed on said spectral reflectance, and
    wherein said "optically indistinguishable" means such a state that said interference peak is undetected when said spectral reflectance of the anti-reflection film is measured at wavelengths in the range of 380-800 nm with 5 degrees of incident angle and said optical simulation is performed on said spectral reflectance.
2. The method according to claim 1, wherein it takes a period of time in the range of 2-60 seconds for said solvents contained in said coated layer to evaporate off to a level of

10 wt % or lower after said coated layer is formed at a temperature in the range of 20° C. to 30° C. at normal atmospheric pressure.

3. The method according to claim 1, wherein said coating liquid for forming said low refractive index hard coat layer comprises said solvents in the range of 55-85 wt %.

4. The method according to claim 1, wherein said transparent substrate comprises triacetyl cellulose and said solvents in said coating liquid for forming said low refractive index hard coat layer include N-methylpyrrolidone.

5. The method according to claim 1, wherein said ionizing radiation is ultraviolet radiation.

6. The method according to claim 1, wherein said ionizing radiation is electron beam radiation.

7. A method for manufacturing an anti-reflection film which has a low refractive index hard coat layer on a transparent substrate comprising:

preparing a coating liquid for forming said low refractive index hard coat layer comprising low refractive index particles, a binder matrix which comprises an ionizing radiation curable material, and solvents;

coating said coating liquid for forming said low refractive index hard coat layer to form a coated layer on said transparent substrate;

performing a primary drying process, said primary drying process comprising drying said coated layer under an atmosphere of 0.2-10 vol % solvent vapor, the solvent vapor being from one or more of the solvents of the coating liquid, and the primary drying process continuing until said solvents of the coating liquid comprise 10 wt % or less of said coated layer; and irradiating said coated layer with ionizing radiation to form said low refractive index hard coat layer, said solvents in said coating liquid for forming said low refractive index hard coat layer including a solvent which dissolves said transparent substrate or causes said transparent substrate to swell by a ratio in the range of 30-90 wt %, said low refractive index hard coat layer including a mixed layer in which said binder matrix and a component of said transparent substrate blend together with a gradient and a localized layer which comprises said low refractive index particles and said binder matrix, said mixed layer being optically indistinguishable, and said localized layer being optically distinguishable and having a refractive index in the range of 1.29-1.43 and an optical thickness in the range of 100-200 nm;

wherein said "optically distinguishable" means such a state that an interference peak is detected when a spectral reflectance of the anti-reflection film is measured at wavelengths in the range of 380-800 nm with 5 degrees of incident angle and an optical simulation is performed on said spectral reflectance; and wherein said "optically indistinguishable" means such a state that said interference peak is undetected when said spectral reflectance of the anti-reflection film is measured at wavelengths in the range of 380-800 nm with 5 degrees of incident angle and said optical simulation is performed on said spectral reflectance.

8. The method according to claim 7, wherein 55-85 wt % of said coating liquid for forming said low refractive index hard coat layer comprises said solvents.

9. The method according to claim 7, wherein said primary drying process is performed at a temperature in the range of 20° C. to 30° C. and at normal atmospheric pressure.

10. The method according to claim 9, wherein said primary drying process is initiated just after said coated layer is formed.

11. The method according to claim 10, wherein it takes a period of time in the range of 2-60 seconds to perform said primary drying process.

12. The method according to claim 11, comprising performing a secondary drying process, which is performed at a temperature in the range of 50-150° C., after said primary drying process.

13. The method according to claim 7, comprising performing a secondary drying process after said primary drying process, said secondary drying process being performed at a temperature in the range of 50-150° C.

14. The method according to claim 7, wherein said transparent substrate comprises triacetyl cellulose and said solvents in said coating liquid for forming said low refractive index hard coat layer include N-methylpyrrolidone.

15. The method according to claim 7, wherein said ionizing radiation is ultraviolet radiation.

16. The method according to claim 7, wherein said ionizing radiation is electron beam radiation.

* * * * *